United States Patent
Beesley et al.

(10) Patent No.: US 7,238,921 B2
(45) Date of Patent: Jul. 3, 2007

(54) COMBINATION BREAD TOASTER AND STEAMER DEVICE WITH SHARED WATTAGE AND METHOD

(75) Inventors: Brian K. Beesley, Draper, UT (US); Eric Hales, Ogden, UT (US)

(73) Assignee: Back to Basics Products, LLC, Vernon Hills, IL (US)

( * ) Notice: Subject to any disclaimer, the term of this patent is extended or adjusted under 35 U.S.C. 154(b) by 0 days.

(21) Appl. No.: 11/519,983

(22) Filed: Sep. 11, 2006

(65) Prior Publication Data

US 2007/0075067 A1    Apr. 5, 2007

Related U.S. Application Data

(63) Continuation of application No. PCT/US2006/006318, filed on Feb. 17, 2006, and a continuation of application No. 11/155,007, filed on Jun. 15, 2005, and a continuation of application No. 11/154,282, filed on Jun. 15, 2005.

(60) Provisional application No. 60/654,699, filed on Feb. 17, 2005, provisional application No. 60/717,954, filed on Sep. 16, 2005.

(51) Int. Cl.
*A47J 27/04* (2006.01)
*A47J 37/08* (2006.01)
*A47J 27/12* (2006.01)

(52) U.S. Cl. .............. 219/386; 219/392; 219/401; 219/412; 219/414; 219/428; 99/327; 99/339; 99/357

(58) Field of Classification Search .............. None
See application file for complete search history.

(56) References Cited

U.S. PATENT DOCUMENTS

| 40,605 | A | 11/1863 | Cadwell |
|---|---|---|---|
| 373,113 | A | 11/1887 | Wagner |
| 374,706 | A | 12/1887 | Rosenkranz |
| 482,235 | A | 9/1892 | Eads |
| 1,315,724 | A | 9/1919 | Hipwell |
| 1,412,536 | A | 4/1922 | Mayer |

(Continued)

FOREIGN PATENT DOCUMENTS

CN    01343156.0    4/2002

(Continued)

OTHER PUBLICATIONS

Froth Aufait "Owner's Manual & Recipe Book" p. 1-12.

(Continued)

*Primary Examiner*—Joseph Pelham
(74) *Attorney, Agent, or Firm*—Thorpe North & Western LLP

(57) ABSTRACT

A combination bread toaster and steamer device and method includes inserting at least one piece of bread into a bread slot of a combination bread toaster and steamer device; placing water into a heater pan of a steamer compartment on the combination bread toaster and steamer device; placing another food into the steamer compartment; activating at least one bread heating element disposed adjacent the bread slot and a steamer heating element disposed adjacent the steamer compartment; and activation of the steamer heating element reducing wattage to the bread heating element that would be used by the bread heating element when operating alone.

13 Claims, 14 Drawing Sheets

U.S. PATENT DOCUMENTS

| | | |
|---|---|---|
| 1,572,221 A | 2/1926 | Petersen |
| 1,874,079 A | 8/1932 | Black |
| 2,012,637 A | 8/1935 | Ribley |
| 2,066,997 A | 1/1937 | Mueller |
| 2,070,545 A | 2/1937 | Gilbert |
| 2,086,858 A | 7/1937 | Dunkelberger |
| 2,104,089 A | 1/1938 | Marks |
| D118,470 S | 1/1940 | Drachenberg |
| 2,205,147 A | 6/1940 | Madsen |
| 2,282,866 A | 5/1942 | Hagen |
| 2,311,379 A | 2/1943 | Gillanders |
| 2,315,018 A | 3/1943 | Lawrence |
| 2,334,122 A | 11/1943 | Payne |
| 2,345,769 A | 4/1944 | Osrow |
| 2,419,674 A | 4/1947 | Caplan |
| 2,429,736 A | 10/1947 | Wales |
| D153,645 S | 5/1949 | Stiles |
| D156,635 S | 12/1949 | Law et al. |
| D161,188 S | 12/1950 | Klug |
| 2,559,196 A | 7/1951 | Medved |
| 2,628,081 A | 2/1953 | Laired |
| 2,710,707 A | 6/1955 | Persak, Jr. |
| 2,785,547 A | 3/1957 | Barros |
| D183,177 S | 7/1958 | Oertli |
| 2,851,258 A | 9/1958 | Siehrs |
| D186,419 S | 10/1959 | Keefe |
| 2,945,634 A | 7/1960 | Beck et al. |
| D189,904 S | 3/1961 | Seltsam |
| 3,013,775 A | 12/1961 | Bruntjen |
| 3,042,265 A | 7/1962 | Rodth |
| D194,389 S | 1/1963 | Bejamin |
| 3,088,345 A | 5/1963 | Campbell |
| 3,104,089 A | 9/1963 | Seltsam |
| 3,107,711 A | 10/1963 | Azmus |
| D199,888 S | 12/1964 | Dewenter |
| D200,230 S | 2/1965 | Seltsam |
| 3,216,473 A | 11/1965 | Dewenter |
| 3,240,246 A | 3/1966 | Dewendter |
| D205,827 S | 9/1966 | Plagenberg |
| 3,315,947 A | 4/1967 | Nauta |
| 3,346,029 A | 10/1967 | Harris |
| 3,355,068 A | 11/1967 | Harland |
| 3,396,655 A | 8/1968 | Yoshida et al. |
| 3,417,972 A | 12/1968 | Vincent |
| 3,427,636 A | 2/1969 | Seifert |
| 3,765,275 A | 10/1973 | Johnson |
| 3,780,393 A | 12/1973 | Gaetke |
| 3,895,548 A | 7/1975 | Sauve |
| 3,920,224 A | 11/1975 | Fassauer |
| 3,934,757 A | 1/1976 | Malek et al. |
| 3,938,784 A | 2/1976 | Moreton |
| 3,974,758 A | 8/1976 | Stone, Jr. |
| 4,030,707 A | 6/1977 | Moreton |
| 4,069,750 A | 1/1978 | Kemp |
| 4,071,789 A | 1/1978 | Ernster et al. |
| 4,100,394 A | 7/1978 | Tilp |
| D249,701 S | 9/1978 | Maples et al. |
| 4,116,366 A | 9/1978 | Takenakashima et al. |
| 4,119,020 A | 10/1978 | Sharp et al. |
| 4,137,578 A | 2/1979 | Felici |
| 4,141,286 A | 2/1979 | Smit |
| 4,201,487 A | 5/1980 | Backhaus |
| 4,250,771 A | 2/1981 | Berler |
| 4,252,160 A | 2/1981 | Numbers |
| 4,268,080 A | 5/1981 | Lindley |
| D261,657 S | 11/1981 | Villa |
| 4,337,000 A | 6/1982 | Lehmann |
| 4,357,861 A | 11/1982 | Di Girolamo |
| D267,841 S | 2/1983 | Leslie |
| D268,811 S | 5/1983 | Adams |
| D269,471 S | 6/1983 | Auerbach |
| 4,392,594 A | 7/1983 | Swett et al. |
| 4,395,792 A | 8/1983 | Cosner |
| 4,397,427 A | 8/1983 | Howard |
| D271,368 S | 11/1983 | Belland et al. |
| 4,488,664 A | 12/1984 | Cleland |
| 4,501,538 A | 2/1985 | Bray et al. |
| 4,513,688 A | 4/1985 | Fassauer |
| 4,537,332 A | 8/1985 | Brown et al. |
| 4,561,782 A | 12/1985 | Jacobsen et al. |
| 4,572,060 A | 2/1986 | Yung-Kuan |
| 4,610,145 A | 9/1986 | Arzberger et al. |
| 4,624,177 A | 11/1986 | Ito et al. |
| 4,664,530 A | 5/1987 | Kurome et al. |
| 4,706,555 A | 11/1987 | Nakamura et al. |
| D295,138 S | 4/1988 | Hyde |
| 4,748,901 A | 6/1988 | Burmeister |
| 4,770,090 A | 9/1988 | Woon et al. |
| 4,800,935 A | 1/1989 | Buchser et al. |
| 4,811,657 A | 3/1989 | Rixen |
| 4,824,369 A | 4/1989 | Levy |
| 4,825,758 A | 5/1989 | Snowball et al. |
| 4,833,978 A | 5/1989 | Martone et al. |
| 4,872,402 A | 10/1989 | Johnson et al. |
| 4,891,966 A | 1/1990 | Kramer |
| 5,033,272 A | 7/1991 | Buchser et al. |
| 5,033,273 A | 7/1991 | Buchser et al. |
| 5,048,402 A | 9/1991 | Letournel et al. |
| 5,060,558 A | 10/1991 | Beumer et al. |
| D323,094 S | 1/1992 | Russell et al. |
| 5,133,247 A | 7/1992 | Pastrick |
| 5,165,327 A | 11/1992 | Ferrara, Jr. |
| 5,203,252 A | 4/1993 | Hsieh |
| D337,234 S | 7/1993 | McGinnis |
| 5,231,918 A | 8/1993 | Grzywna |
| 5,239,914 A | 8/1993 | Salomon et al. |
| D340,831 S | 11/1993 | Manabe |
| RE34,473 E | 12/1993 | Ryan et al. |
| 5,269,154 A | 12/1993 | Schmidt |
| 5,302,021 A | 4/1994 | Jennett et al. |
| 5,323,691 A | 6/1994 | Reese et al. |
| 5,323,973 A | 6/1994 | Ferrara, Jr. |
| 5,356,215 A | 10/1994 | Inoue et al. |
| D363,634 S | 10/1995 | Cohn |
| 5,463,932 A | 11/1995 | Olson |
| D365,579 S | 12/1995 | Baker et al. |
| 5,474,213 A | 12/1995 | Unger |
| 5,479,851 A | 1/1996 | McClean et al. |
| D367,659 S | 3/1996 | Baker et al. |
| D370,151 S | 5/1996 | McLinden et al. |
| 5,518,312 A | 5/1996 | Inoue et al. |
| 5,522,306 A | 6/1996 | DeMars |
| D373,504 S | 9/1996 | Leverrier |
| 5,560,284 A | 10/1996 | Weidman et al. |
| 5,567,049 A | 10/1996 | Beaudet et al. |
| 5,577,638 A | 11/1996 | Takagawa |
| D377,290 S | 1/1997 | Saltet |
| D378,400 S | 3/1997 | Kowalics |
| 5,611,262 A | 3/1997 | Rizzuto et al. |
| D379,050 S | 5/1997 | Kohanski |
| 5,636,923 A | 6/1997 | Nejat-Bina |
| 5,649,471 A | 7/1997 | Heynderickx et al. |
| D383,352 S | 9/1997 | Powel |
| 5,662,032 A | 9/1997 | Baratta |
| 5,671,664 A | 9/1997 | Jacobson |
| 5,673,608 A | 10/1997 | DeMars |
| 5,687,636 A | 11/1997 | Diore et al. |
| 5,690,021 A | 11/1997 | Grey |
| 5,694,831 A | 12/1997 | Haroun et al. |
| D394,986 S | 6/1998 | Lallemand |
| 5,758,963 A | 6/1998 | Xie et al. |
| 5,765,467 A | 6/1998 | Levine et al. |
| 5,791,523 A | 8/1998 | Oh |
| 5,823,667 A | 10/1998 | Fukushima et al. |

| | | |
|---|---|---|
| 5,857,596 A | 1/1999 | Lee |
| 5,857,946 A | 1/1999 | Brown |
| 5,872,402 A | 2/1999 | Hasegawa |
| D407,262 S | 3/1999 | Dingelstad |
| 5,881,930 A | 3/1999 | Lee |
| D407,593 S | 4/1999 | Hu et al. |
| D408,208 S | 4/1999 | Hsu |
| D412,262 S | 7/1999 | Roundtree |
| 5,957,036 A | 9/1999 | Warner et al. |
| 5,957,039 A | 9/1999 | Secord |
| 5,964,143 A | 10/1999 | Driscoll et al. |
| D417,358 S | 12/1999 | Dutruel |
| 6,003,734 A | 12/1999 | Oh |
| 6,009,792 A | 1/2000 | Kraan |
| 6,009,793 A | 1/2000 | Blankenship et al. |
| 6,016,741 A | 1/2000 | Tsai et al. |
| D419,821 S | 2/2000 | Powell et al. |
| 6,039,126 A | 3/2000 | Hsieh |
| D423,156 S | 4/2000 | Joiner et al. |
| 6,058,829 A | 5/2000 | Endres |
| 6,065,188 A | 5/2000 | Wold et al. |
| 6,065,861 A | 5/2000 | Chen |
| D427,838 S | 7/2000 | Lee |
| 6,101,924 A | 8/2000 | Blankenship et al. |
| 6,118,933 A | 9/2000 | Roberson |
| D432,850 S | 10/2000 | Saltet |
| 6,135,173 A | 10/2000 | Lee et al. |
| 6,158,626 A | 12/2000 | Guerra et al. |
| 6,164,191 A | 12/2000 | Liu et al. |
| D439,797 S | 4/2001 | Planca et al. |
| 6,283,625 B2 | 9/2001 | Frankel et al. |
| D448,967 S | 10/2001 | Planca et al. |
| 6,298,770 B1 | 10/2001 | Blandenship et al. |
| 6,318,247 B1 | 11/2001 | Di Nunzio et al. |
| D453,281 S | 2/2002 | Plumtre et al. |
| D453,443 S | 2/2002 | Hoare et al. |
| 6,374,725 B1 | 4/2002 | Leung |
| 6,402,365 B1 | 6/2002 | Wong |
| D463,194 S | 9/2002 | Busick et al. |
| D465,127 S | 11/2002 | Lee |
| 6,488,400 B1 | 12/2002 | Masip et al. |
| 6,523,994 B2 | 2/2003 | Lawson |
| 6,527,433 B2 | 3/2003 | Daniels, Jr. |
| 6,532,864 B2 | 3/2003 | Ancona et al. |
| D473,421 S | 4/2003 | Daniels, Jr. |
| D473,600 S | 4/2003 | Khasminsky |
| 6,539,840 B2 | 4/2003 | Choi et al. |
| D474,065 S | 5/2003 | Daniels, Jr. |
| D474,067 S | 5/2003 | Daniels, Jr. |
| D474,643 S | 5/2003 | Daniels, Jr. |
| 6,564,975 B1 | 5/2003 | Garman |
| 6,571,686 B1 | 6/2003 | Riley et al. |
| 6,586,710 B2 | 7/2003 | Williamson |
| 6,595,121 B1 | 7/2003 | Chang Chien |
| D478,242 S | 8/2003 | Garman |
| 6,609,821 B2 | 8/2003 | Wulf et al. |
| D479,666 S | 9/2003 | Barker |
| 6,637,681 B1 | 10/2003 | Planca et al. |
| D482,235 S | 11/2003 | Yui |
| 6,652,137 B1 | 11/2003 | Bosch et al. |
| D483,601 S | 12/2003 | Anglay |
| D483,607 S | 12/2003 | Chang Chien |
| D483,993 S | 12/2003 | Boyle |
| 6,681,960 B2 | 1/2004 | Garman |
| D486,533 S | 2/2004 | Morris |
| D487,213 S | 3/2004 | Boyle et al. |
| D487,668 S | 3/2004 | Sands |
| 6,707,009 B1 | 3/2004 | Ancona et al. |
| D493,331 S | 7/2004 | Munoz |
| 6,772,678 B2 | 8/2004 | Choi et al. |
| 6,817,750 B1 | 11/2004 | Sands |
| 6,831,254 B2 | 12/2004 | Barritt |
| D500,633 S | 1/2005 | Sands |
| 6,837,153 B1 | 1/2005 | Chang Chien |
| D501,759 S | 2/2005 | Sands |
| D502,358 S | 3/2005 | Weaden |
| 6,935,767 B2 | 8/2005 | Nikkhah |
| 6,966,689 B2 | 11/2005 | Daniels |
| D512,265 S | 12/2005 | McCurrach |
| 6,981,795 B2 | 1/2006 | Nikkah |
| D519,314 S | 4/2006 | Blaise |
| D524,591 S | 7/2006 | Averty |
| D525,472 S | 7/2006 | Beesley |
| D526,846 S | 8/2006 | Kim |
| 7,105,778 B1 | 9/2006 | DeLong et al. |
| 2001/0006486 A1 | 7/2001 | Ofvcerberg |
| 2001/0029823 A1 | 10/2001 | Ancona et al. |
| 2002/0027175 A1 | 3/2002 | Capp |
| 2002/0060219 A1 | 5/2002 | Rypan |
| 2002/0080678 A1 | 6/2002 | Daniel, Jr. |
| 2003/0099154 A1 | 5/2003 | Daniels, Jr. |
| 2003/0188801 A1 | 10/2003 | Garman |
| 2004/0118299 A1 | 6/2004 | Garman et al. |
| 2004/0159624 A1 | 8/2004 | Miller et al. |
| 2004/0211324 A1 | 10/2004 | Wanat |
| 2004/0244598 A1 | 12/2004 | Garman |
| 2004/0264294 A1 | 12/2004 | Pryor |
| 2005/0018532 A1 | 1/2005 | Nikkah |
| 2005/0018534 A1 | 1/2005 | Nikkah |
| 2005/0045671 A1 | 3/2005 | Beesley et al. |
| 2005/0047272 A1 | 3/2005 | Sands |
| 2005/0068847 A1 | 3/2005 | Sands |
| 2005/0122837 A1 | 6/2005 | Bravard et al. |
| 2005/0178273 A1 | 8/2005 | Meuleners et al. |
| 2005/0185507 A1 | 8/2005 | Beesley et al. |
| 2005/0199534 A1 | 9/2005 | Daniels, Jr. |
| 2005/0207270 A1 | 9/2005 | Beesley |
| 2005/0236386 A1 | 10/2005 | Fisher |
| 2006/0176765 A1 | 8/2006 | Proyr et al. |

FOREIGN PATENT DOCUMENTS

| | | |
|---|---|---|
| DE | 1098171 | 1/1961 |
| DE | 28 18 593 | 10/1979 |
| DE | 29718161 | 2/1998 |
| EP | 1475024 | 11/2004 |
| GB | 764361 A | 12/1956 |
| HK | 0010171.3 | 2/2000 |
| JP | 55151287 | 11/1980 |
| JP | 2-172609 | 7/1990 |
| JP | 2004-41286 | 2/2004 |
| JP | 2004-62325 | 3/2004 |
| JP | 2004 113278 | 4/2004 |
| JP | 2004-113278 | 4/2004 |
| JP | 2004 357752 | 12/2004 |
| JP | 2005-328946 | 12/2005 |
| JP | 2006-102083 | 4/2006 |
| WO | WO 03/001954 A1 | 1/2003 |
| WO | WO2004/080252 | 9/2004 |
| WO | WO 2005/037036 | 4/2005 |

OTHER PUBLICATIONS

Operating Instructions for the Mr. Coffee Cocomotion Hot Chocolate Maker pp. 2-16.

Global Sources, Breakfast Machine AV2008 Patented Breakfast Machine of 3-in-1 design; Toaster, Egg Boiler, Coffee Maker in High-Grade Design.

Alibaba.com, Guangzhou Well Electronic Factory, Sell Breakfast Maker 3-in-1.

Qschina.com, 3 In 1 Breakfast Machine with 6L Oven and .8L Coffee maker and 4-egg boiler, Foshan Weihe Yingfeng Electrical Appl Co., Ltd.

Global sources, Congbao Electronic Manufacture Co. Ltd Automatic Breakfast Maker with Slide-out Crumb Tray, Easy to Clean.

Gizmodo The Gadgets Weblog, Three-in-One Breakfast Toaster Coffee Machine Egg Boiler.

Made-in-China.com, 3-in-1 Breakfast Maker.

Back to Basics Company Website Egg and Muffin Toaster http://www.backtobasicsproducts.com.

Hechts Department Store Website Back to Basics Egg and Muffin Toaster http://www.hechts.com/figts/onlineshopping/WB?DSP=4&PCR=14:10012:10079:10394&IID=118554&c=1.

10 Crescent Lane Mar. 2001 Catalog, Jenn-Air Artrezi Blender.

Frontgate Outfitting America's Finest Homes, Early spring 2004 Catalog, Item #13861 Artrezi Blender.

Frontgate outfitting America's Finest Homes, Fall 2002 Catalog, T-Fal, Item #16513 Chrome 40 Oz. Blender.

Chef's Professional Restaurant Equipment for the Home Chef Since 1979, Fall 2002, chefscatalog.com.

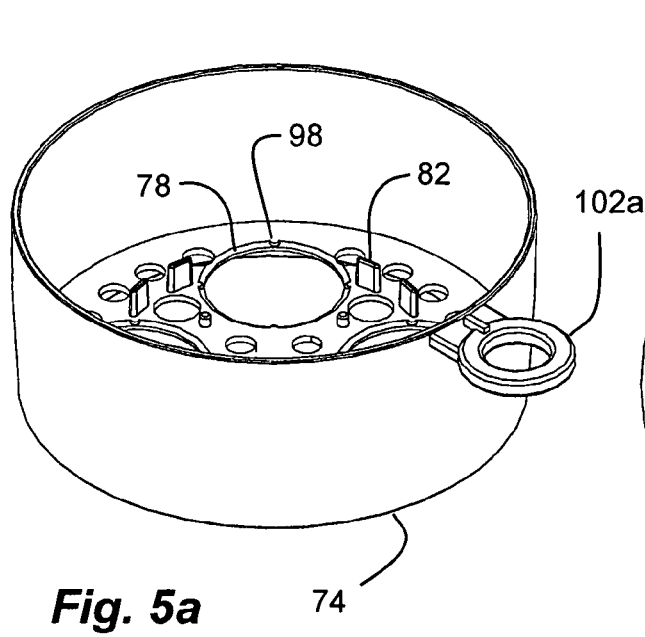
*Fig. 5a*
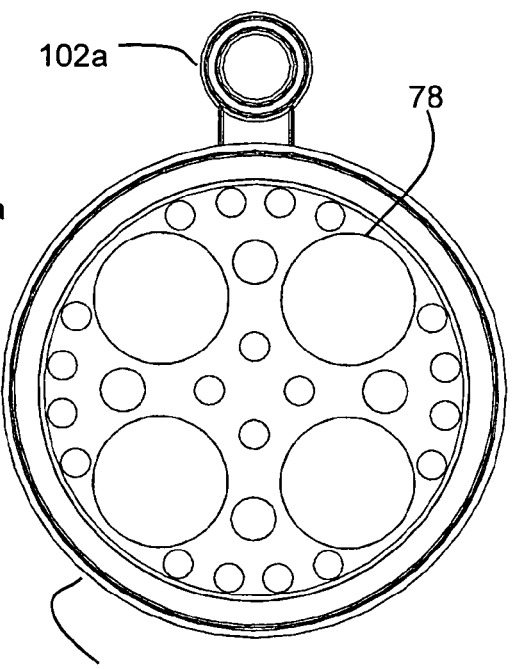
*Fig. 5b*
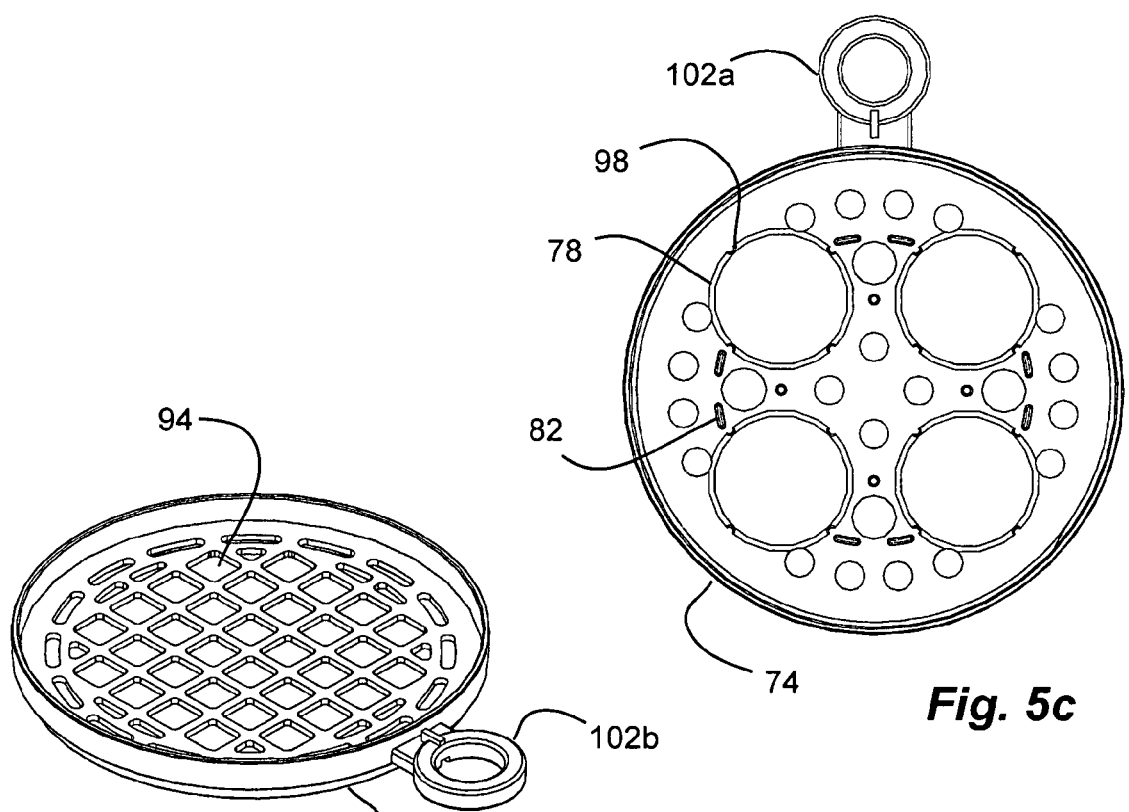
*Fig. 5c*
*Fig. 6*

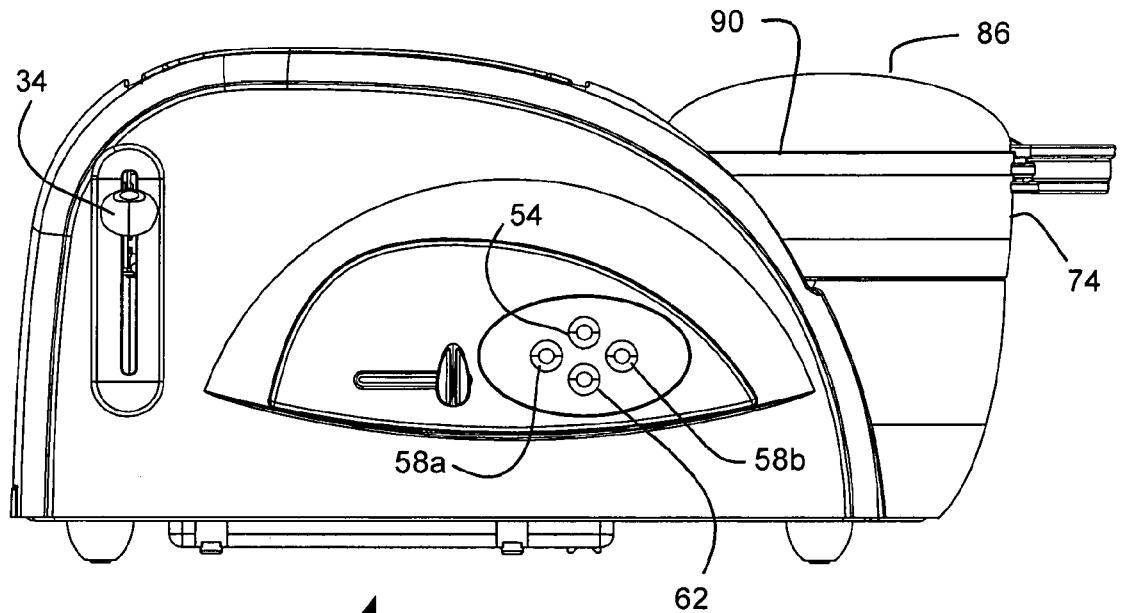
Fig. 7
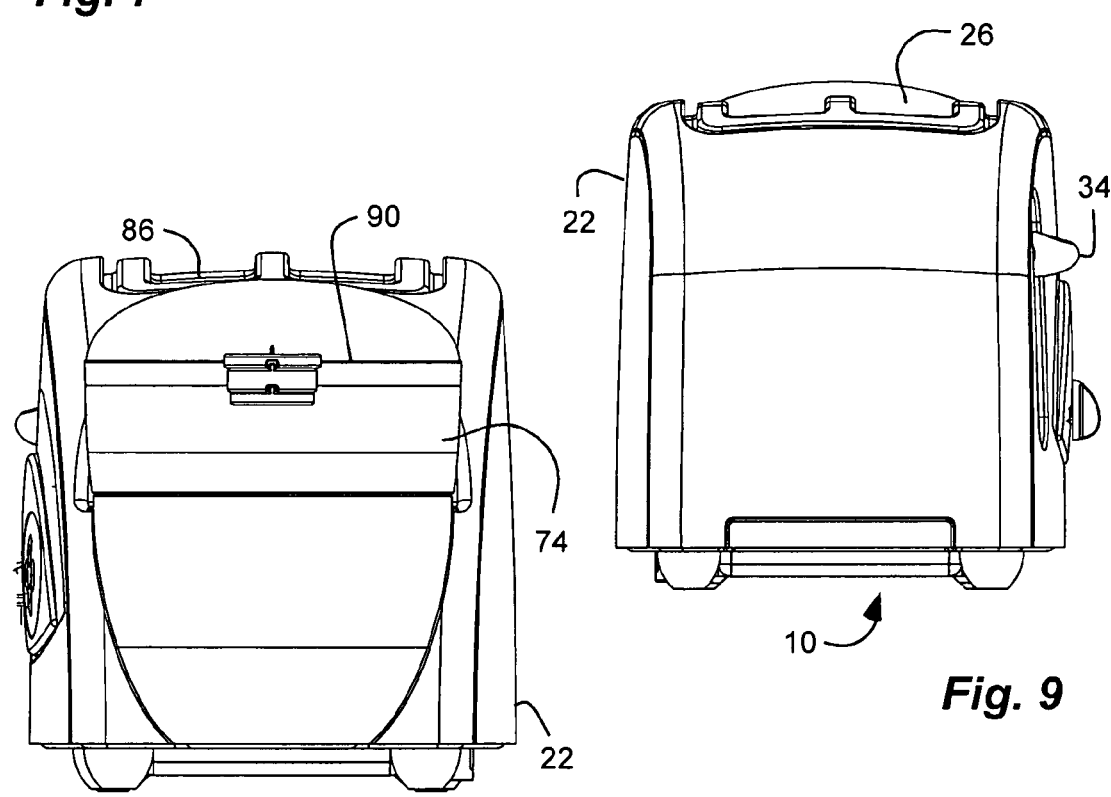
Fig. 8
Fig. 9

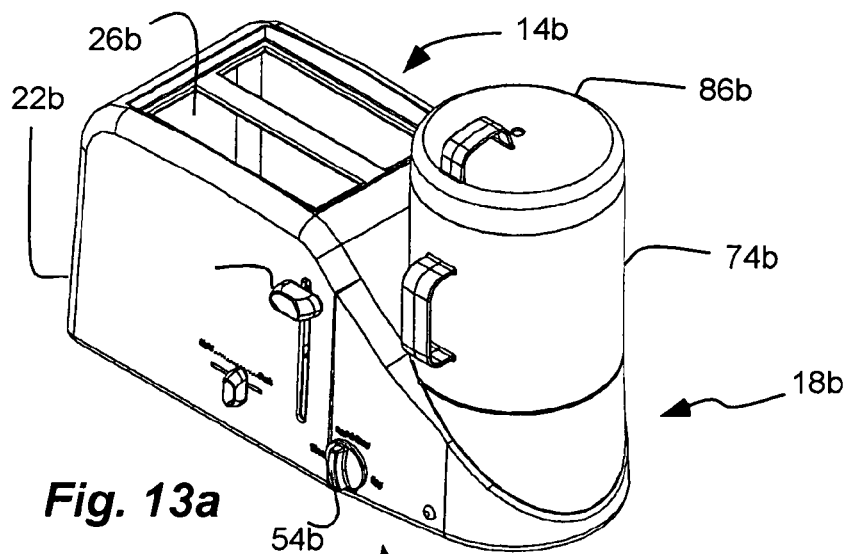
*Fig. 13a*
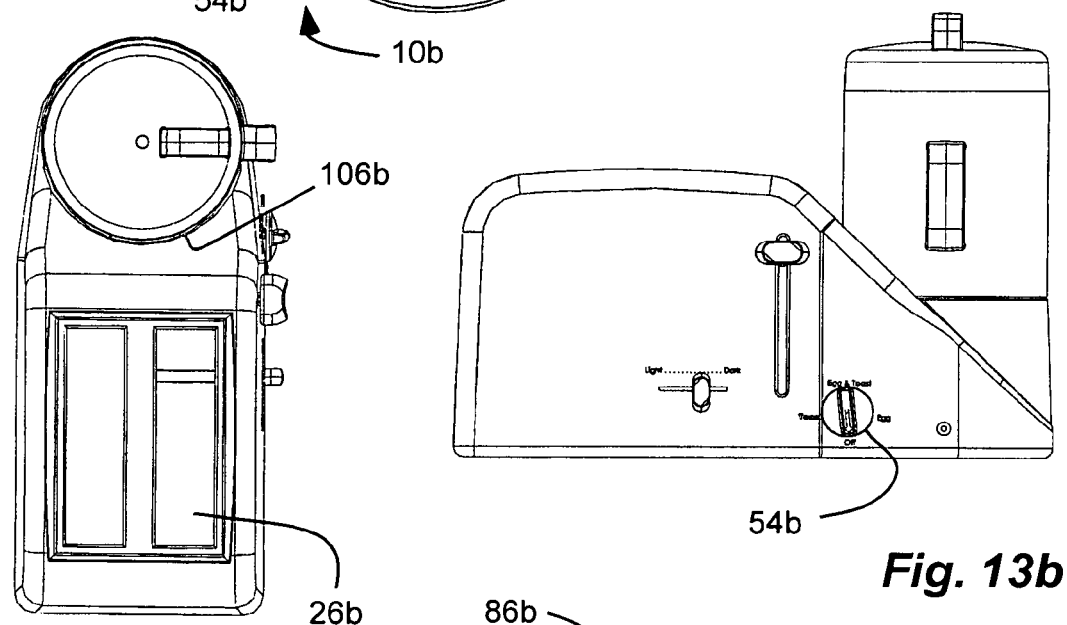
*Fig. 13b*
*Fig. 13d*
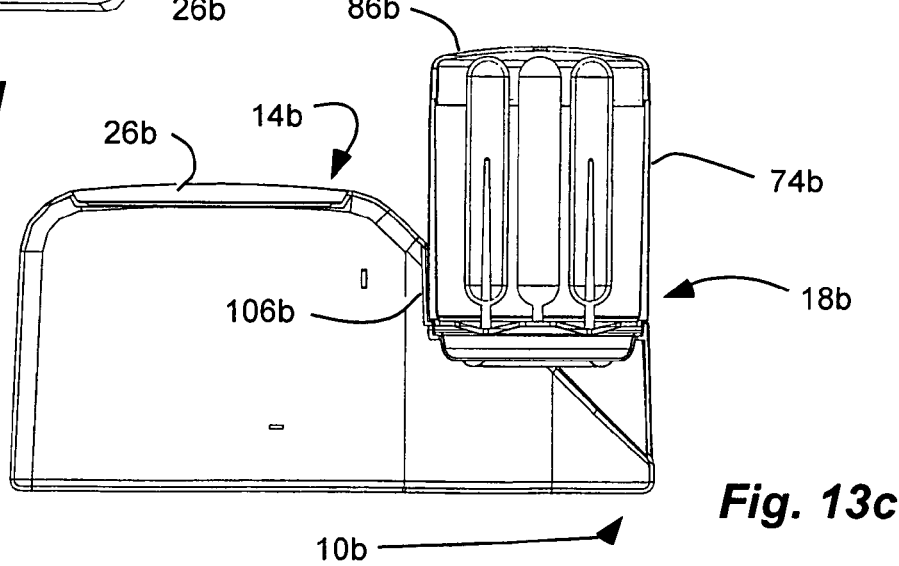
*Fig. 13c*

COMBINATION BREAD TOASTER AND STEAMER DEVICE WITH SHARED WATTAGE AND METHOD

PRIORITY CLAIM

This is a continuation of PCT International Application No. PCT/US2006/006318, filed Feb. 17, 2006; which claims priority to U.S. Provisional Patent Application Ser. No. 60/717,954, filed Sep. 16, 2005; and to U.S. patent application Ser. Nos. 11/155,007 and 11/154,282 both filed Jun. 15, 2005; both of which claim priority to U.S. Provisional Patent Application Ser. No. 60/654,699, filed Feb. 17, 2005; and priority is claim to U.S. Provisional Patent Application Ser. No. 60/717,954, filed Sep. 16, 2005; all of which are herein incorporated by reference.

BACKGROUND

1. Field of the Invention

The present invention relates generally to a device, such as a breakfast sandwich maker, and method for simultaneously toasting bread and steaming or cooking another food, such as an egg and/or meat, for making a breakfast sandwich while sharing wattage between the toasting and the steaming.

2. Related Art

Multi-function breakfast machines have been proposed for making several breakfast items, such as toast, eggs and coffee. Such machines include a horizontally oriented toaster oven, an egg broiler, and a coffee maker or warmer. For example, see U.S. Pat. No. 5,203,252 or U.S. Des. Pat. 340,831. Some machines may have an egg receiving area or a coffee receiving area disposed over a toaster oven. Some machines may have a coffee maker disposed adjacent a toaster oven and an egg receiving area disposed over the coffee maker. In addition, some of these devices appear to utilize the heat from one device, such as the toaster oven, to cook an egg in the egg broiler or warm coffee. Other machines have been proposed that combine a vertical toaster with a horizontal toaster oven. For example, see U.S. Pat. No. 5,694,831. It will be appreciated that different foods require different heating temperatures and different heating or cooking times. Therefore, many of these devices appear to utilize a plurality of separate controls, for example, separate controls for the toaster oven, egg broiler and coffee maker.

SUMMARY OF THE INVENTION

It has been recognized that it would be advantageous to develop a device or method for simultaneously toasting a bread and warming or cooking another food, such as cooking an egg and/or heating a meat. In addition, it has been recognized that it would be advantageous to develop a device or method for automatically toasting a bread and warming or cooking another food. In addition, it has been recognized that it would be advantageous to develop a device or method for combining bread toasting functions and food steaming functions into a single device or method to save time, reduce the number of appliances, and efficiently utilize kitchen or counter space.

The invention provides a method for toasting bread and simultaneously cooking or warming another food with a single device, comprising:
 inserting at least one piece of bread into a bread slot of a combination bread toaster and steamer device;
 placing water into a heater pan of a steamer compartment on the combination bread toaster and steamer device;
 placing another food into the steamer compartment;
 activating at least one bread heating element disposed adjacent the bread slot and a steamer heating element disposed adjacent the steamer compartment; and
 activation of the steamer heating element reducing wattage to the bread heating element that would be used by the bread heating element operating alone.

In addition, the invention provides a method for toasting bread and simultaneously cooking or warming another food with a single device, comprising:
 inserting at least one piece of bread into a bread slot of a combination bread toaster and steamer device;
 activating at least one bread heating element disposed adjacent the bread slot for a shorter time period and at a higher wattage;
 placing water into a heater pan of a steamer compartment on the combination bread toaster and steamer device;
 placing another food into the steamer compartment;
 activating a steamer heating element disposed adjacent the heater pan, and the bread heating element for a longer time period and at a reduced wattage.

Furthermore, the invention provides a combination bread toaster and steamer device, comprising:
 a) a housing;
 b) at least one bread slot extending into the housing;
 c) at least one bread heating element disposed adjacent the bread slot;
 d) a steamer compartment, disposed on the housing, including a heater pan configured to receive water;
 e) a steamer heating element disposed adjacent the heater pan; and
 f) a controller operatively coupled to the bread heating element and the steamer heating element; and
 g) the at least one bread heating element including a variable wattage heating element and the controller being configured to reduce wattage to the variable wattage heating element when the steamer heating element is operated.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein:

FIG. 5a is a perspective view of a steamer cup of the device of FIG. 1;

FIGS. 5b and c are top and bottom views, respectively, of the steamer cup of FIG. 5a;

FIG. 6 is a perspective view of a meat tray of the device of FIG. 1;

FIG. 7 is a front side view of the device of FIG. 1;

FIGS. 8 and 9 are end views of the device of FIG. 1;

FIG. 13a is a perspective view of another combination bread toaster and steamer device or hot dog maker in accordance with another embodiment of the present invention;

FIG. 13b is a side view of the device of FIG. 13a;

FIG. 13c is a cross-sectional side view of the device of FIG. 13a;

FIG. 13d is a top view of the device of FIG. 13a;

Figure 1:
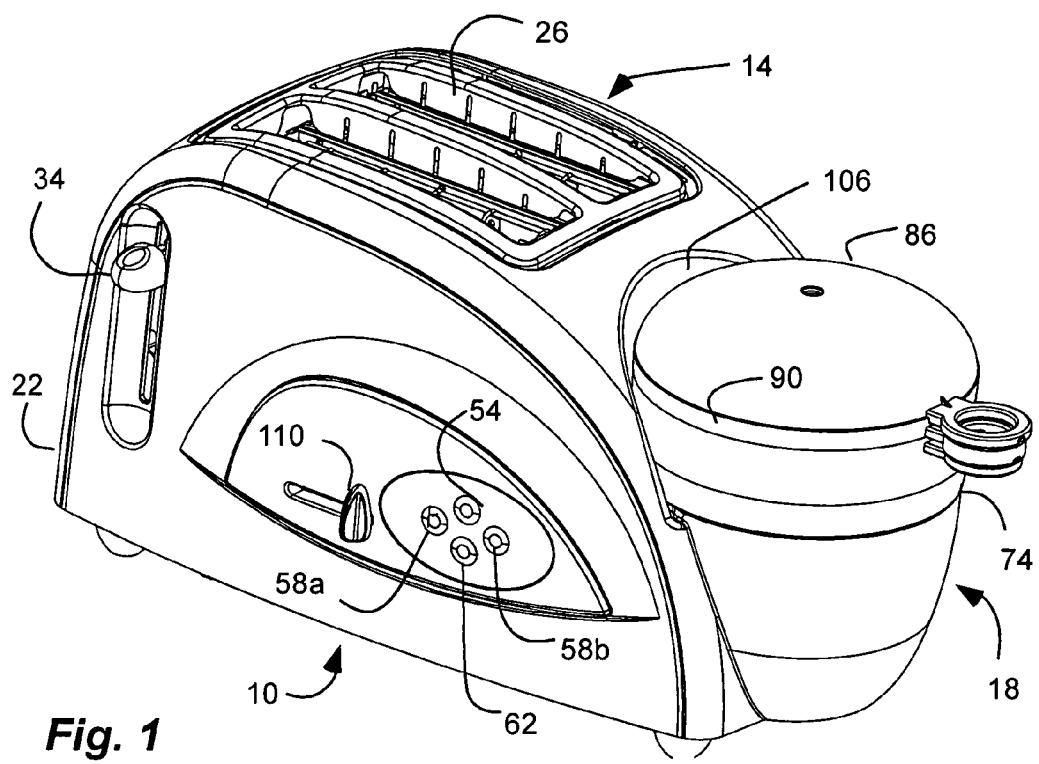
FIG. 1 is a perspective view of a combination bread toaster and steamer device or breakfast sandwich maker in accordance with an embodiment of the present invention.
Figure 2A:
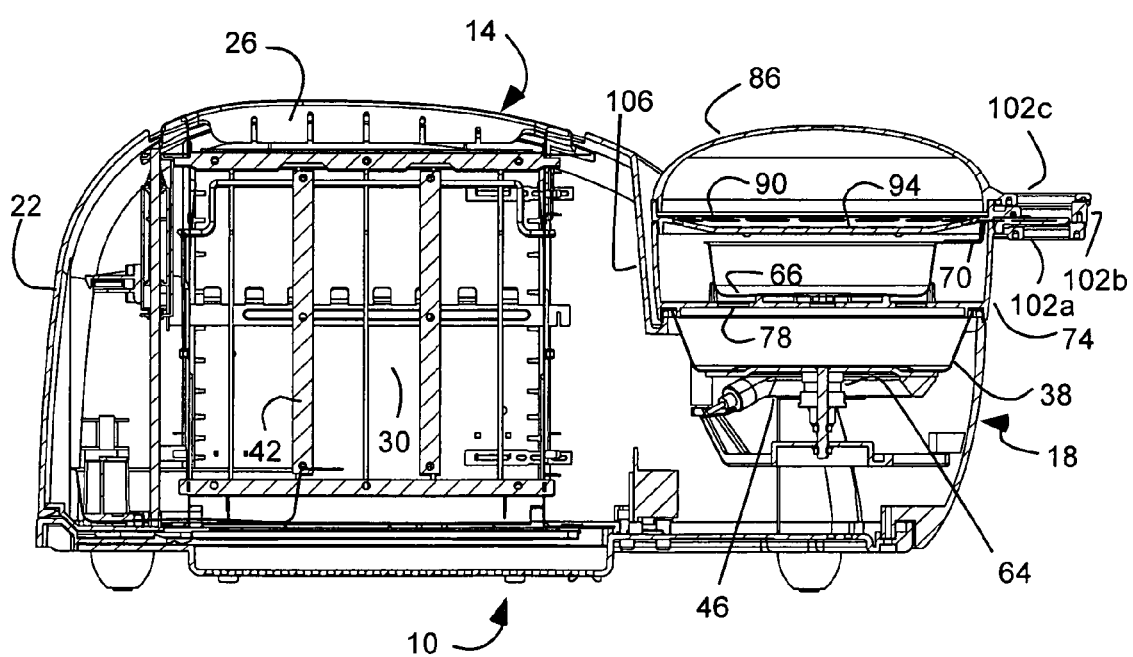
FIG. 2a is a side cross-sectional view of the device of FIG. 1.
Figure 2B:
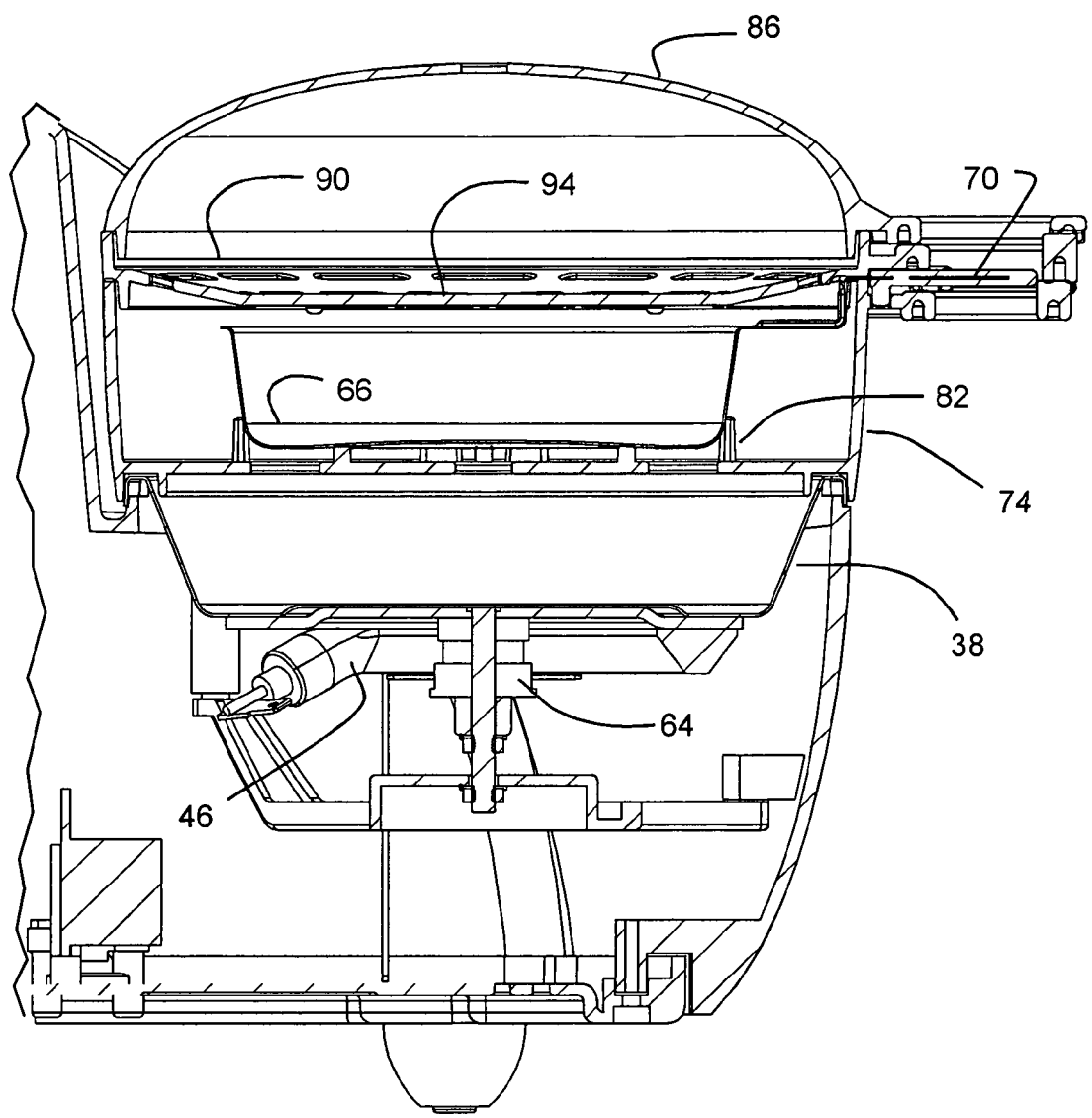
FIG. 2b is a partial side cross-sectional view of the device of FIG. 1.
Figure 3A:
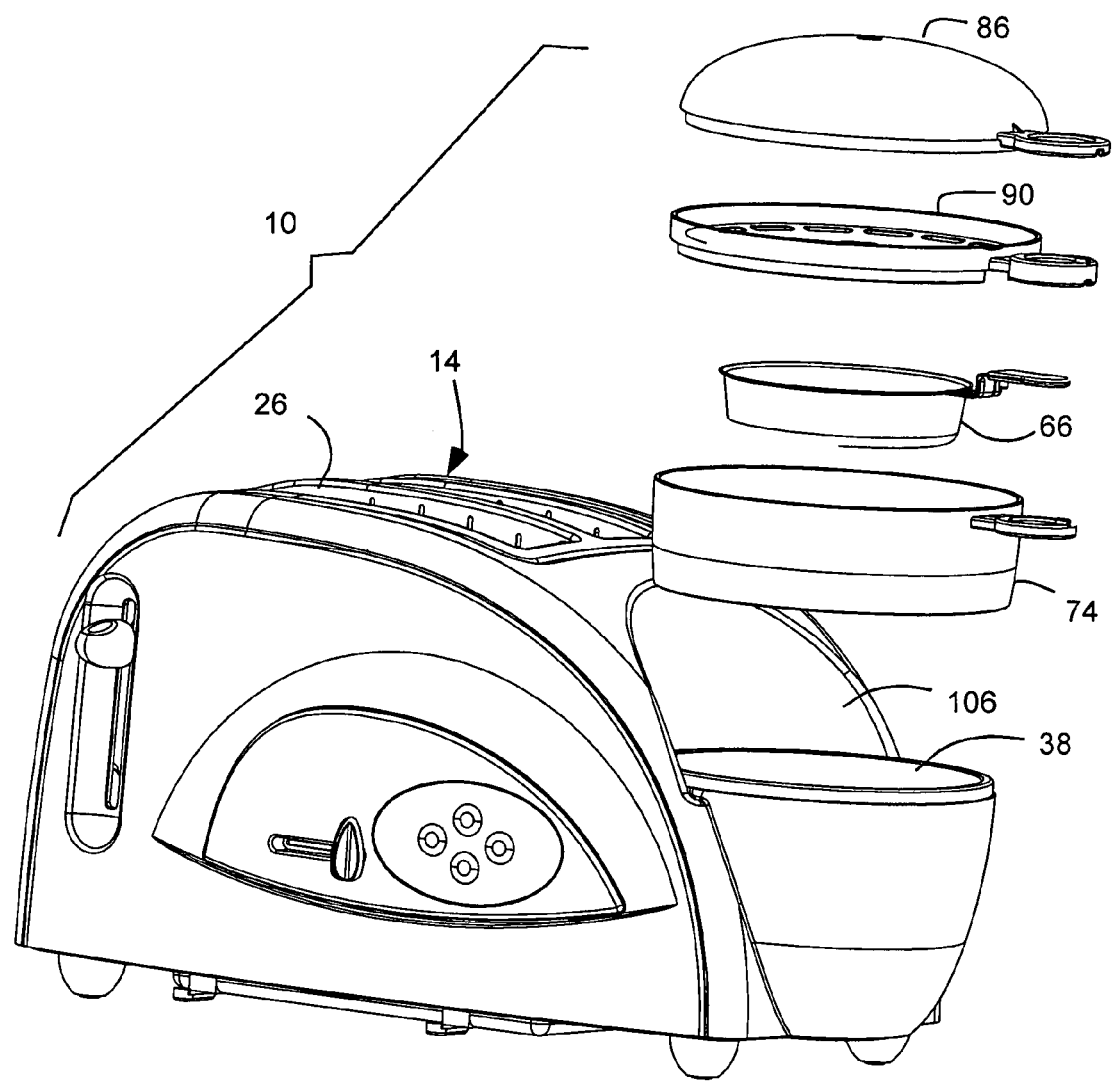
FIG. 3a is a partially exploded perspective view of the device of FIG. 1.
Figure 4:
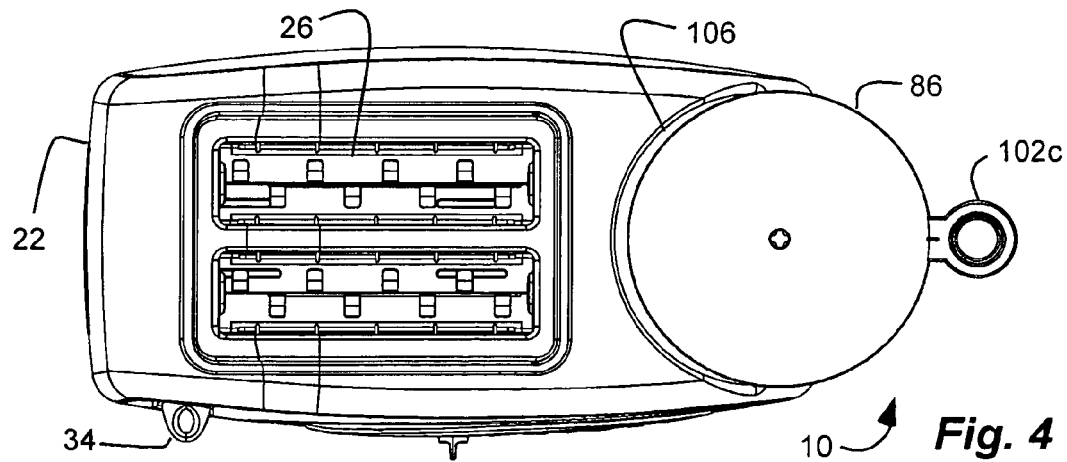
FIG. 4 is a top view of the device of FIG. 1.
Figure 3B:
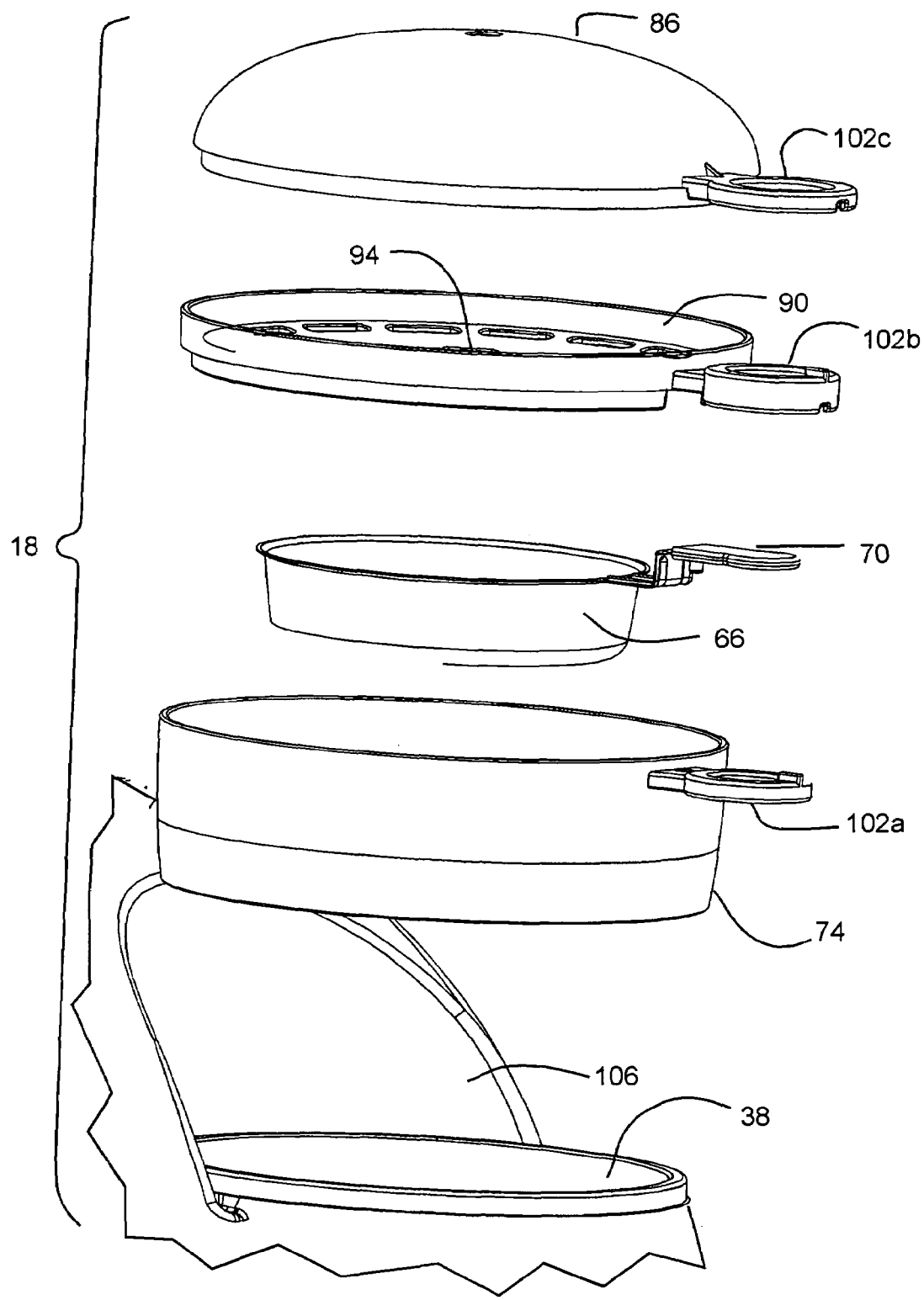
FIG. 3b is a detailed exploded perspective view of a portion of the device of FIG. 1.
Figure 10:
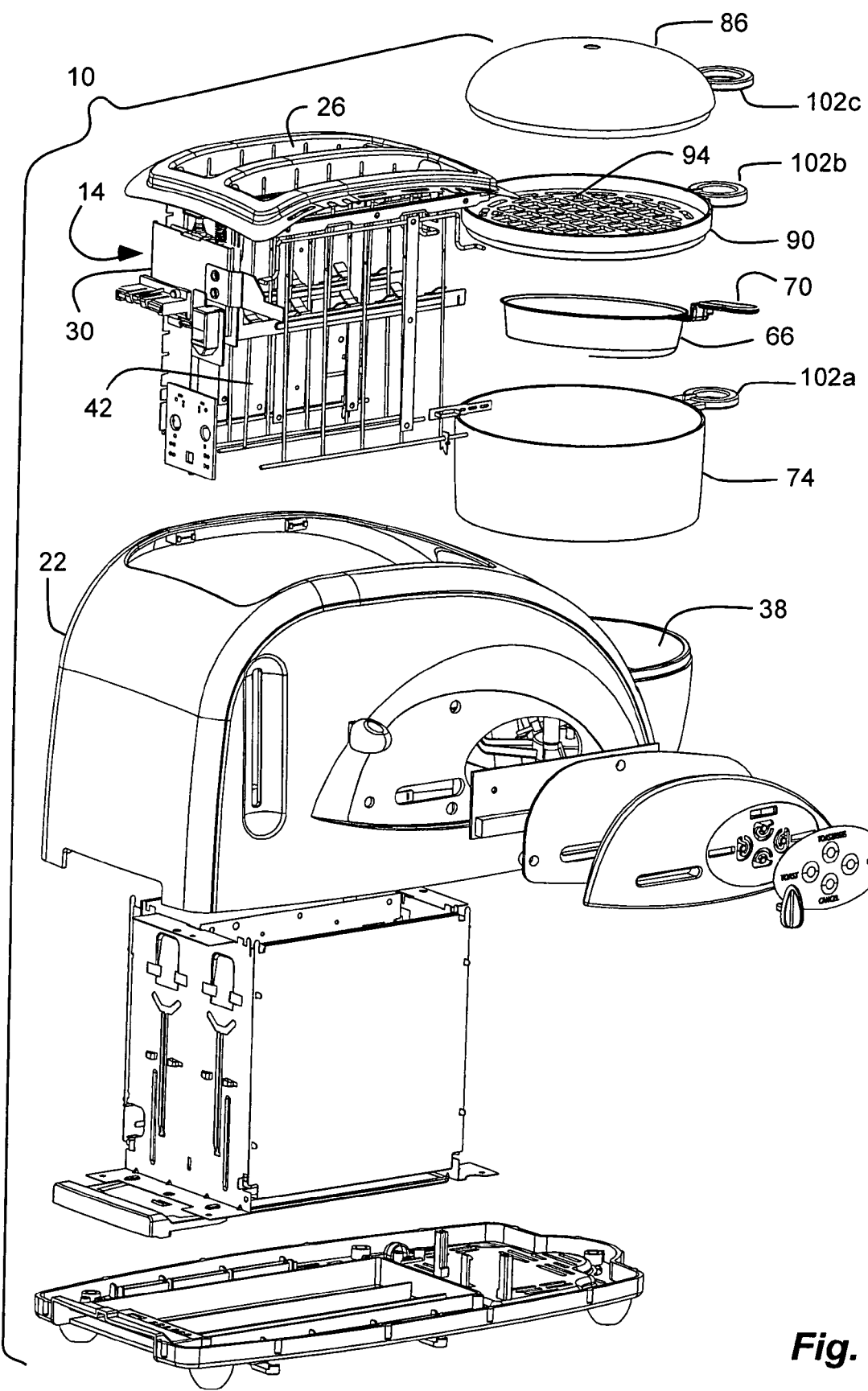
FIG. 10 is an exploded view of the device of FIG. 1.
Figure 11:
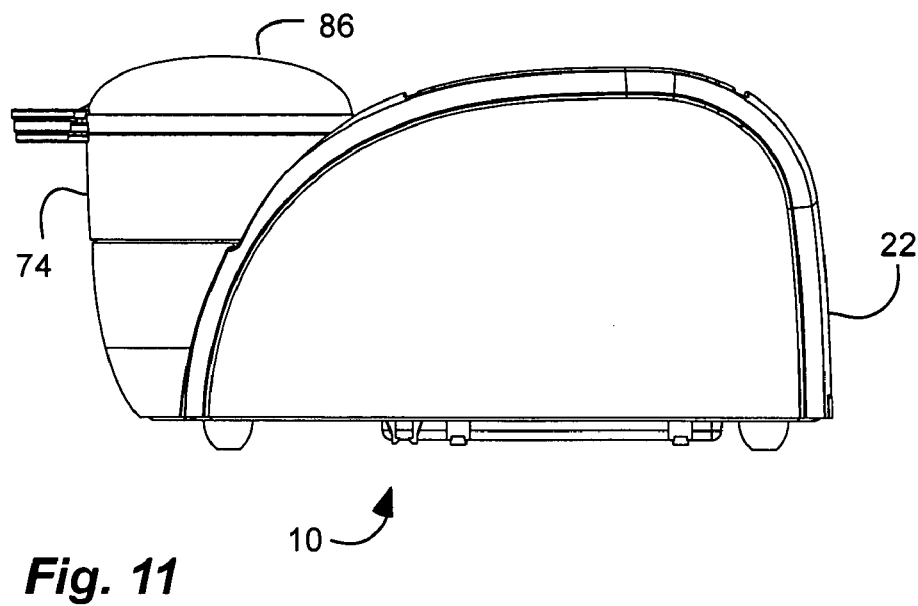
FIG. 11 is a back side view of the device of FIG. 1.
Figure 12:
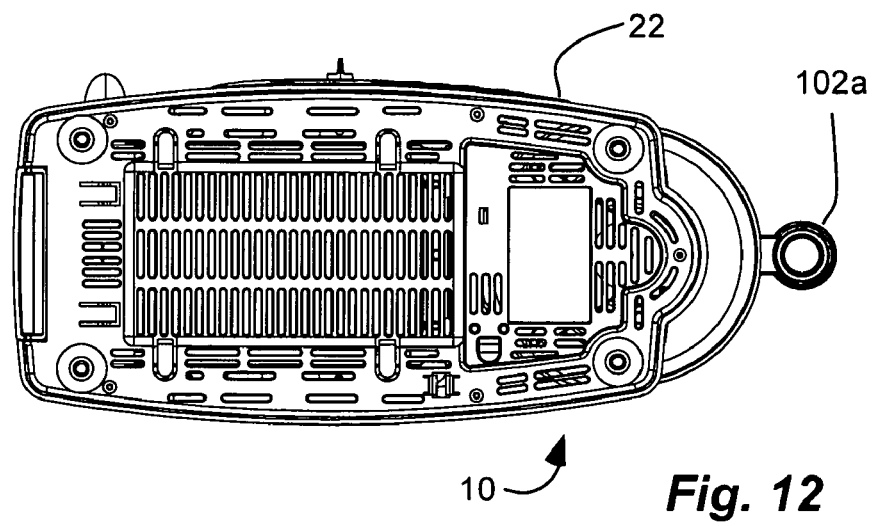
FIG. 12 is a bottom view of the device of FIG. 1.
Figure 14:
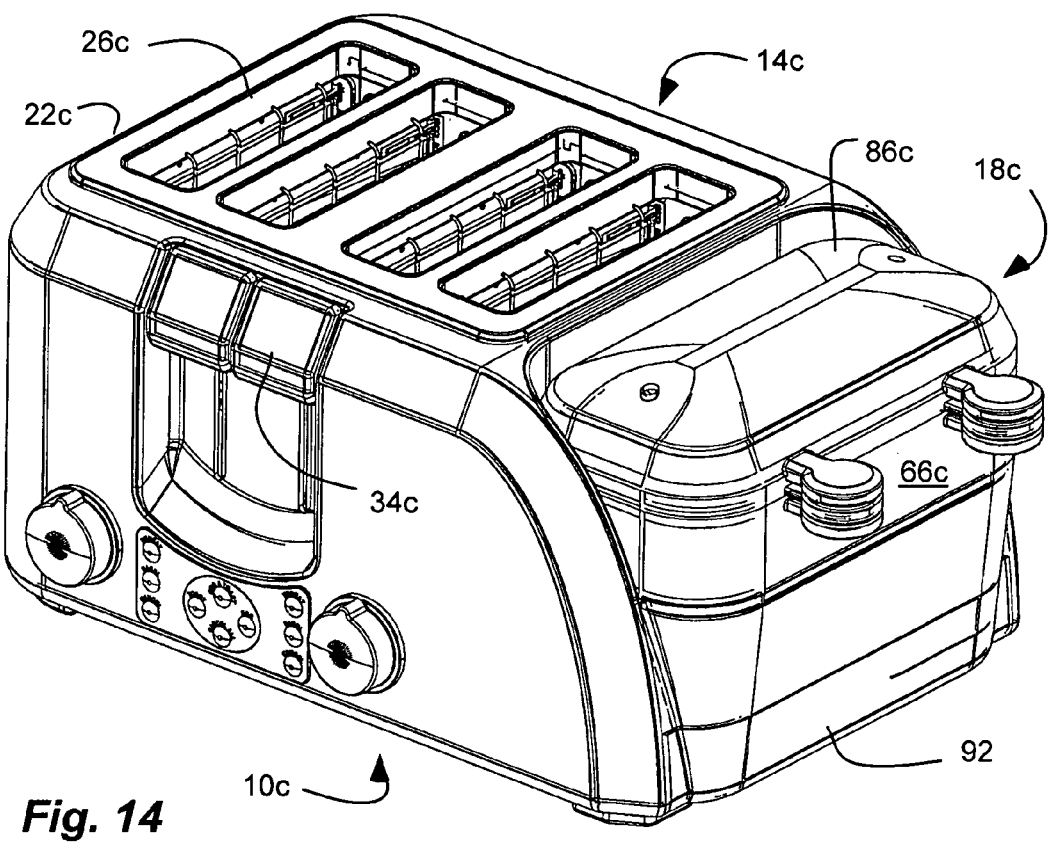
FIG. 14 is a perspective view of another combination bread toaster and steamer device or breakfast sandwich maker in accordance with another embodiment of the present invention.
Figure 15:
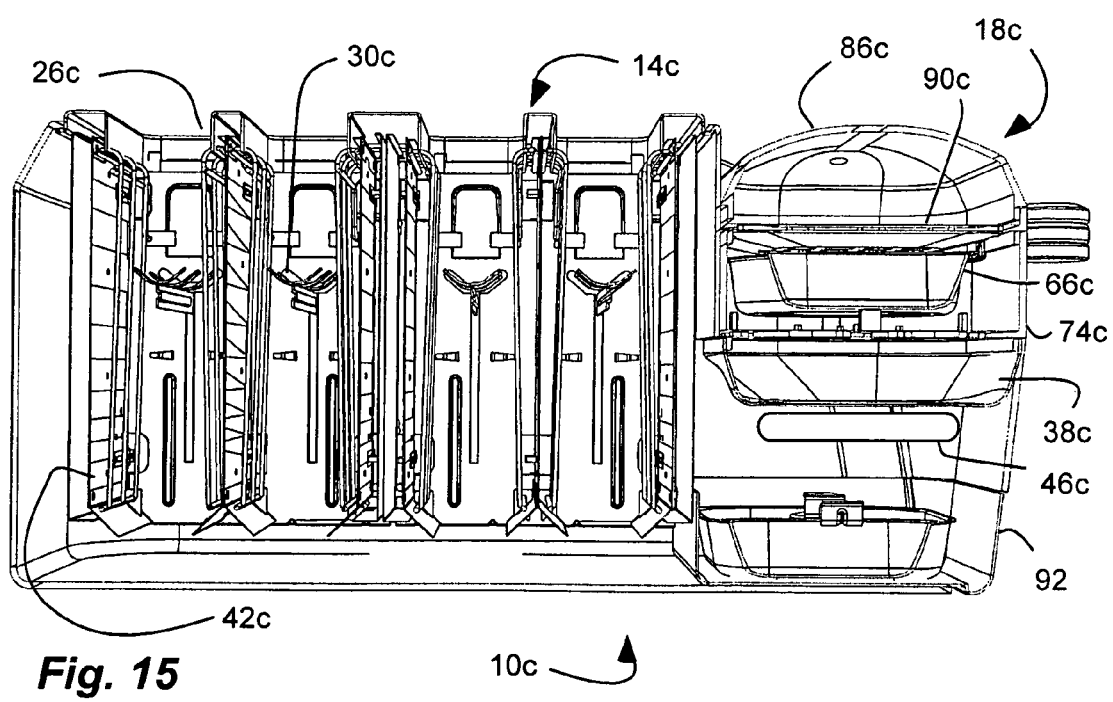
FIG. 15 is a side cross-sectional view of the device of FIG. 14.
Figure 16A:
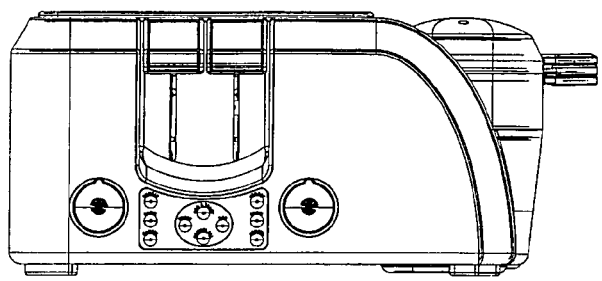
FIG. 16a is a front view of the device of FIG. 14.
Figure 16B:
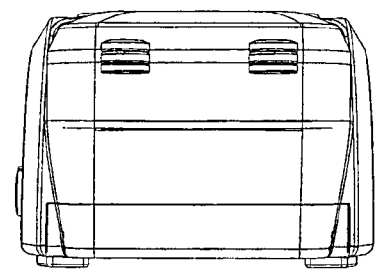
FIG. 16b is an end view of the device of FIG. 14.
Figure 16C:
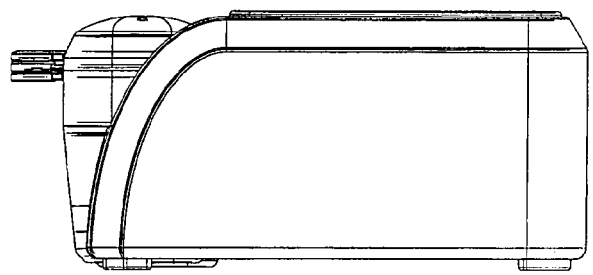
FIG. 16c is a rear view of the device of FIG. 14.
Figure 16D:
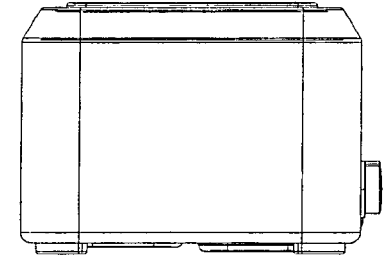
FIG. 16d is an end view of the device of FIG. 14.
Figure 16E:
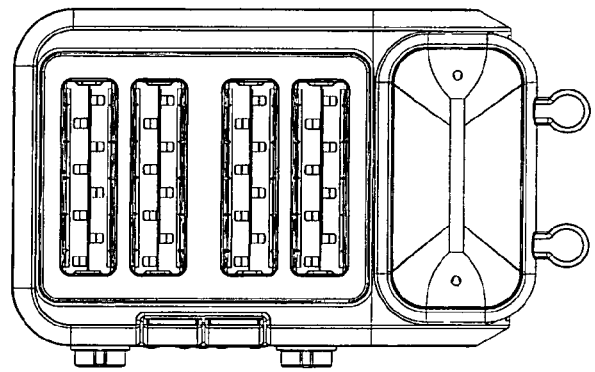
FIG. 16e is a top view of the device of FIG. 14.
Figure 16F:
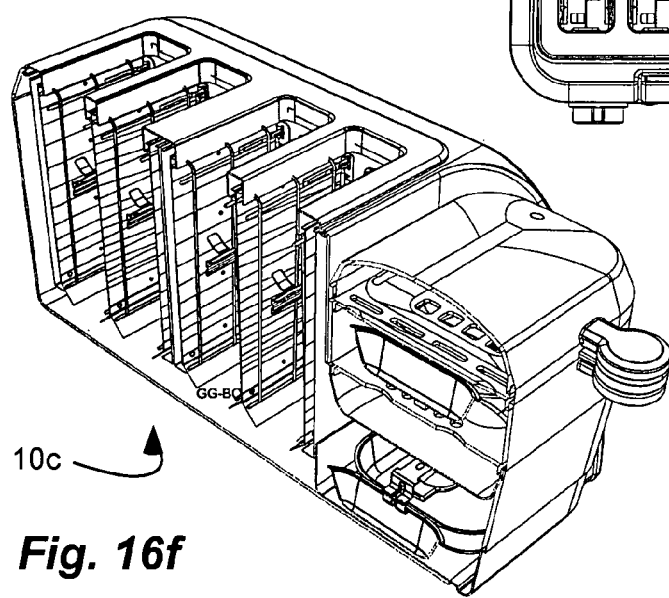
FIG. 16f is a cross-sectional perspective view of the device of FIG. 14.
Figure 17:
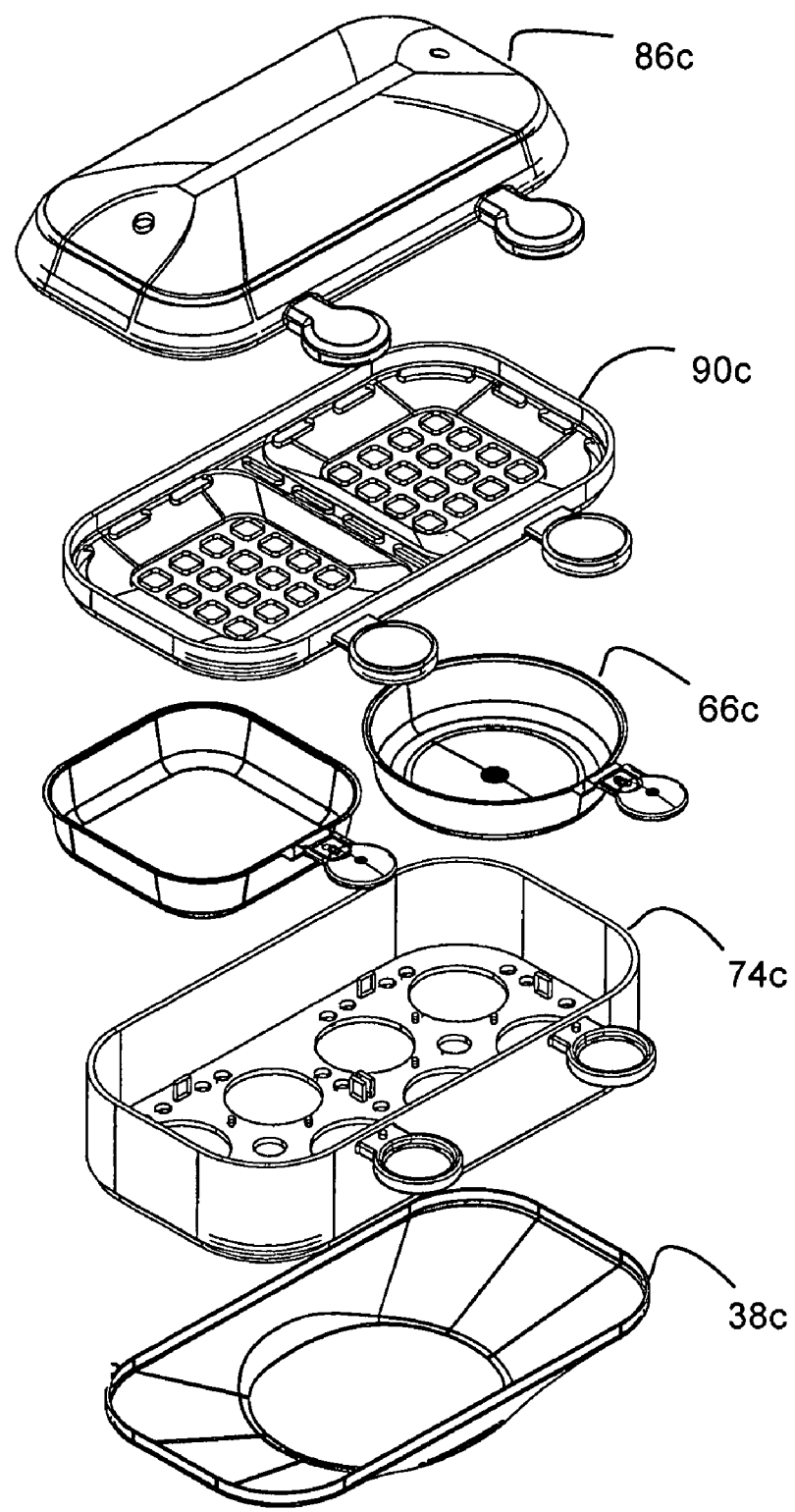
FIG. 17 is a partial exploded view of the device of FIG. 14.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

As illustrated in FIGS. 1–12, a combination bread toaster and steamer device, indicated generally at 10, is shown in accordance with an exemplary embodiment of the present invention. Specifically, the device 10 is configured as a breakfast sandwich maker, or to simultaneously toast bread or English muffins and cook one or more eggs. The term "bread" is used broadly herein to include any type of bread, including for example, sliced bread, English muffins, bagels, rolls, buns, etc.

The device 10 includes both a bread toaster or a bread toasting mechanism 14 and a steamer or a steamer compartment 18 integrated into a single appliance. Thus, the device can perform toasting and steaming functions. Such a single appliance can efficiently utilize space, increase available kitchen or counter space, and/or reduce the number of appliances or dishes that would typically be utilized. In addition, the function or operation of both the bread toaster 14 and steamer 18 is coordinated to efficiently and automatically toast bread and cook or heat another food, such as an egg, as discussed in greater detail below. It will be appreciated that the cooking times for bread and another food, such as an egg, differ. Thus, the device can be configured to automatically delay toasting of the bread until after the steaming or egg cooking function has begun. Alternatively, the device can be configured to begin toasting of the bread and steaming or egg cooking at the same time, but can also maintain the bread or toast within the device until the steaming or egg cooking function terminates, in order to maintain the temperature of the bread or toast. Alternatively, the time for toasting the bread can be increased to coincide with the cooking time of the egg such as by reducing the wattage of the toasting device or toasting heating element.

The device 10 includes a housing 22 to support both the toaster 14 and the steamer 18. The housing 22 and/or toaster 14 can include a pair of bread slots 26. The bread slots 26 can be vertically oriented and can extend into the housing from a top of the housing, as opposed to the horizontal orientation and side access of a toaster oven. In addition, the bread slots 26 can be spaced-apart from one another and oriented in a parallel relationship, as shown.

The device 10 or toaster 14 can also include a lift mechanism 30 (FIG. 10) for raising and lowering bread out of and into the slots, as is known in the art. The lift mechanism can include a slide arm or lever 34 that is coupled to the lift mechanism 30 inside the housing, but extends through a slot in the housing to an engagement end that can be grasped or contacted by a user to manually raise and lower lift mechanism. The lift mechanism 30 can be spring biased to a raised position, and can include an automatic release mechanism that holds the lift mechanism in a down position and which depends on time or heat to release the mechanism, as is known in the art. The lift mechanism is one example of means for elevating and lowering bread in the bread slots.

The steamer (or egg) compartment 18 is also disposed on or associated with the housing 22. The steamer 18 can be positioned at an end of the housing, and at an end of the pair of slots 26. The steamer 18 includes a heater pan 38 to receive water. Thus, the heater pan 38 can be bowl shaped or concave.

One or more heating elements are disposed in the housing 22 and associated with the toaster 14 and steamer 18, or the bread slots 26 and heater pan 38. The heating elements can be electrical resistance type heating elements, as is known in the art. One or more bread heating elements 42 can be disposed adjacent the bread slots 26. For example, the heating elements 42 can be disposed on both sides of both bread slots. A steamer or egg heating element 46 can be disposed adjacent the steamer compartment 18, or adjacent and below the heater pan 38. Heat from the bread heating elements 42 toasts the bread, while heat from the steamer heating element 46 heats, boils or steams water in the heater pan 38.

The bread toasting mechanisms can be configured to toast, warm, and/or toast only one side. For example, bread heating elements can be disposed on both sides of a slot, and both can be activated to toast, such as at a higher temperature or for a longer time period. One or both can be activated at a lower temperature or for a shorter time period to warm. Only one can be activated to toast only one side, such as with a bagel.

In addition, the housing 22 can include a control panel with one or more controls, buttons or inputs to operate the device 10. The inputs can be electrically or operatively coupled to control electronics or a controller which are electrically or operatively coupled to the heating elements 42 and 46. The control electronics or controller can be of any appropriate type and design, and can include a timer, to activate and deactivate the heating elements. For example, the controller can include a PCB and/or an IC circuit. The control panel can include a single input 54 for selecting and controlling both the toasting and steaming function. In addition, the slider arm or lever 34, or the lift mechanism 30, can be operatively coupled to the controller. Thus, by engaging the single input 54 for both toasting and steaming, and depressing the slider arm or lever 34, both the toaster 14 and steamer 18 can be activated and controlled. Therefore, the bread heating element and the steamer heating element share a common controller for activating both the bread heating element and the steamer heating element. The controller can be the control electronics or an input.

As indicated above, the controller can be configured to activate the steamer heating element 46 first, and then subsequently and automatically activating the bread heating element 42. Thus, the steaming and toasting functions can terminate or complete at substantially the same time so that both the bread and the other food are both hot. It will be appreciated that bread can toast relatively quickly. Thus, beginning the toasting and steaming functions at the same time can result in the bread toasting first and cooling before the steaming function is complete. Thus, the device provides a single input 54 and a controller operatively coupled to the bread heating element 42 and the steamer heating element 46 to initially activate the steamer heating element, and automatically and subsequently activate the bread heating element. The controller or IC circuit is an example of means for automatically activating the bread heating element subsequent to activation of the steamer heating element; or means for delaying operation of the bread heating element with respect to the steamer heating element.

Additional inputs can also be provided to separately control the device, or the toaster and steamer. For example, the control panel can include a selection control with a plurality of inputs operatively coupled to the bread and the steamer heating elements. The selection control or inputs can be selectable between at least three operating conditions, including: operation of only the bread heating element with a bread only input 58*a*; operation of only the steamer heating element with a steamer only input 58*b*; and operation of both the bread heating element and the steamer heating element with the single input 54. In addition, the selection control can include a cancel input 62 that terminates activation of the heating elements. The selection control can include membrane pads that can include indicia indicating the function of the input. In addition, the membrane pads can be back-lit so that the inputs or indicia light when the associated heating element is activated. The toaster function or operation of only the bread heating element can be accomplished by simply depressing the slider arm or lever 34, without the need for the bread only input 58*a*. In addition, the bread only input 58*a* can indicate when selected, such as by flashing, that the slider arm or lever 34 should be depressed to proceed with toasting.

Furthermore, a toasting level input 110 can be provided to select the desired toasting level, or lightness to darkness, of the desired bread or toast. The bread heating element and the steamer heating element can be activated at the same time, but the bread heating element can deactivate prior to the steamer heating element. In such a case, the lift mechanism can be delayed to maintain the bread in the slot, and thus maintain the temperature of the bread, until the steamer heating element terminates.

Alternatively, the toasting level input 110 can be operatively coupled to the controller to adjust the delay of the operation of the bread heating element. For example, if set on the darkest setting, the bread heating element can be activated approximately 45 seconds after activation of the steamer heating element. As another example, if set on a lighter setting, the bread heating element can be activated later, such as after approximately 2 minutes.

As stated above, the device 10 can be configured as a breakfast sandwich machine, or to both toast bread and cook an egg. Thus, the controller can be similarly configured. For example, the controller configured to activate the steamer heating element for approximately four minutes, and configured to activate the bread heating element at least approximately 45 seconds after activation of the steamer heating element. In addition, the indicia for the inputs can be identified as "toast," "egg," "egg and toast," and "cancel."

A thermostat 64 or other sensor can be operatively coupled to the heater pan 38 and the steamer heating element 46, such as by the control electronics or controller, to sense the temperature of the heater pan. It will be appreciated that the temperature of the heater pan 38 will rise if no water is in the heater pan. The controller can be configured to inactivate the steamer heating element 46 at a predetermined temperature to avoid heat damage to other components.

The steamer compartment 18 can include a food cup or an egg cup 66 to receive another food to be cooked or warmed, such as an egg, or the egg white and egg yoke of the opened egg. Alternatively, just the egg white of the opened egg can be used for healthier meals. The egg cup can be formed of a material with good heat transfer characteristics, such as aluminum. The egg cup 66 can include a handle 70 that can be formed of the same material as the egg cup, and that can extend out of the steamer compartment 18. Alternatively, the handle 70 formed of a material with insulative properties, such as plastic, and can remain within the steamer compartment 18. The steamer compartment 18 can include or can form an enclosure into which the egg cup 66 is placed so that steam, and the heat therefrom, surrounds the egg cup to cook the egg.

The steamer compartment 18 can further include, and the enclosure can be formed by, a steamer cup 74 disposed over the heater pan 38 and around the egg cup 66. A plurality of holes 78 can be formed in the bottom of the steamer cup 74 to allow steam and heat to enter the steamer cup. The steamer cup 74 can be removably disposed on the steamer 18 or housing 22 so that it can be removed for cleaning, and can be used to remove the egg or egg cup 66 after cooking without having to grasp the hot egg or hot egg cup. The steamer cup 74 and housing 22 or heater pan 38 can mate or nest to retain the steamer cup. For example, an annular lip or ridge can protrude from the housing 22 or heater pan 38 into an annular groove on the steamer cup. Furthermore, one or more protrusions 82 can extend upwardly from a bottom of the steamer cup 74 to receive the egg cup 66 and to align or center the egg cup 66 in the steamer cup 74, and to elevate the egg cup 66 above the bottom of the steamer cup 74 to allow steam to circulate around the egg cup. A lid 86 can be removably disposed over the steamer cup 74, and thus the egg cup 66, to further form the enclosure. A hole can be provided in the lid to allow steam to escape, and resist build-up of pressure from the steam.

In addition, a meat tray 90 can be disposable over the steamer compartment to warm a meat, such as bacon, sausage, Canadian bacon, etc. The meat tray 90 can include a plurality of apertures or a grill 94 to allow steam to circulate around the meat. The tray can be shaped, and the apertures positioned, to allow drippings from the meat to fall into the egg cup and flavor the egg, and/or without dripping into the heater pan. An annular lip or ridge can protrude from a bottom of the tray 90 into the steamer cup 74 to maintain the tray in position. Thus, a top edge of the steamer cup can abut to a flange of the tray. Similarly, the lid 86 can have an annular lip or ridge protruding into the tray to maintain the lid on the tray. Thus, the steamer cup 74, egg cup 66, tray 90 and/or lid 86 can be stacked in a stable manner. It will be appreciated that the steamer 18 can be utilized without the tray 90, and with the lid 86 disposed directly on the steamer cup 74. In addition, it will be appreciated that the steamer 18 can be utilized without the egg cup 66. The steamer cup 74, and holes therein 78, can be configured to receive one or more whole eggs. Thus, the steamer cup 74 can have a height or depth sized to accommodate a whole egg. The holes 78 in the steamer cup 74 can have a beveled or angled edge to more closely match the angled or curved side of the egg. In addition, a plurality of protrusions 98 can be disposed on the edge of the holes 78 to space the egg from the edge so that an air space is formed between the egg and the edge for better cooking.

The steamer cup 74, the meat tray 90, and/or the lid 86 can each have a handle 102*a–c* that aligns and engages with an adjacent handle to maintain alignment. Thus, the handles 102*a–c* of the steamer cup, meat tray, and/or lid can be grasped and lifted together. The handles 102*a–c* can mate, with a protrusion of one extending into an aperture or indentation of another, to maintain alignment. The handles can be configured to engage an adjacent handle even when one component is removed, such as the handle 102*c* of the lid 86 engaging the handle 102*a* of the steamer cup 74, with the meat tray 90, and thus the handle 102*b*, removed. The handle 70 of the egg cup 66 can nest within, or be sandwiched between, the other handles 102*a–c* to insulate the handle 70 from the user to resist burns. Thus, the steamer cup, the meat tray, the lid and the egg cup can be lifted together.

The housing 22 can include a steamer cup indentation 106 extending into the housing, both horizontally from a side and vertically from a top, to receive the steamer cup 74. The cup indentation can be formed between lateral protrusions of the housing. The indentation 106 can help position the steamer cup 74 over the heating pan 38 and the housing. The indentation 106 can include a substantially vertically oriented wall around at least a portion of the steamer cup indentation. The cup indentation 106 allows the housing 22 or device 10 to be smaller, and can help position steamer cup 74.

In addition, the steamer compartment 18 is recessed into the housing 22 below a top of the housing so that a top of the lid 86 is disposed at an elevation substantially at an elevation of the top of the housing 22. Thus, the device 10 efficiently utilizes space.

In use, the combination bread toaster and steamer device 10 can be utilized to make a breakfast sandwich. Water can be placed in the heater pan 38. The steamer cup 74 can be placed over the heater pan 34. An egg can be opened and at least the egg white placed in the egg cup 66. The egg cup 66 can be placed in the steamer cup 74. A piece of meat can be placed on the meat tray 90, and the meat tray can be placed on the steamer cup 74. The lid 86 can be placed on the meat tray 90 and over the steamer cup 74. One or two pieces of bread or English muffin can be placed in the bread slots 26 of the toaster 14. The single input 54 can be pushed and the slider arm or lever 34 depressed.

As described above, the controller activates the steamer heating element 46 first to begin steaming the water, and thus cooking the egg. After a predetermined delay (such as approximately 45 seconds), the controller activates the bread heating elements 42 to toast the bread. After another predetermined time (such as four minutes), the controller deactivates the heating elements 46 and 42. The toaster 14 can have an independent automatic mechanism that can allow the lifting mechanism to lift the bread, and deactivate the bread heating element 42 independently in accordance with a preselected toasting level associated with a toasting level input 110. The toasting level input 110 can range from light to dark, and can be associated with time of the bread heating elements. The automatic mechanism for releasing the toast can be an electric timer or mechanical sensor, as is known in the art.

After the heating elements are deactivated, the bread, now toast, can be removed, and the egg and the meat placed on or between the bread to form a breakfast sandwich.

Alternatively, a whole egg can be placed into the steamer cup 74 without the egg cup 66 or the meat tray 90.

Alternatively, the bread heating element and the steamer heating element can be activated at the same time, but the bread heating element can deactivate prior to the steamer heating element. In such a case, the lift mechanism for the bread can be delayed to maintain the bread in the slot, and thus maintain the temperature of the bread, until the steamer heating element terminates.

Although the function and operation of the combination bread toaster and steamer device 10, or breakfast sandwich maker, has been described above as being configured to delay toasting so that both toasting and steaming function are completed substantially at the same time, it will be appreciated that the device can be configured so that the toasting function completes before the steaming function. Thus, for example, a user can butter the toasted bread while the steaming function completes. For example, the device can be configured so that selecting the single function of both toasting and steaming and depressing the toaster lever starts both toasting and steaming at the same time.

Although the steamer 18 has been described as including various different parts, it will be appreciated that some of the different parts can be combined. For example, the egg cup 66 may be integrally formed with the steamer cup 74.

Although the steamer 18 has been described and shown on a side, or longitudinal end, of the device, it will be appreciated that the steamer 18 can be positioned on a front or back of the device, or on a lateral side of the device.

Although the steamer 18 or components thereof have been described with respect to certain specific functions, it will be appreciated that other functions or uses may be utilized. For example, the meat tray may be used for a food other than meat. As another example, the egg or food may be placed directly into the steamer cup.

Although the controller has been described above with predetermined times set for eggs, it will be appreciated that the predetermined times can be different for different foods, or that another input or selector can be provided to vary or select the cooking time.

Although the device has been described with respect to a single input for selecting and controlling both the toasting and steaming functions, it will be appreciated that the toaster or bread heating element can be provided with a separate input and the steaming or steamer heating element can be provided with a separate input.

Although the combination bread toaster and steamer device 10 described above is configured as a breakfast sandwich maker, it will be appreciated that the device can be configured for use with other types of food. For example, the device 10*b* can be configured to make hot dogs, as shown in FIGS. 13*a–d*. Thus, the bread slots 26*b* of the toaster 14*b* can be sized deeper or longer to receive and toast hotdog buns, and the steamer compartment 18*b* can be taller or elevated to receive one or more hot dogs or sausages in a vertical orientation. Thus, the steamer cup 74*b* can be taller, and the lid 86*b* can be disposed at a higher elevation to accommodate the hot dogs. In addition, the steamer cup 74b and/or the lid 86b can be configured to support hot dogs. The steamer cup 74 can still be received in a cup indentation 106b in the housing 22b. A turnable knob selector 54b can be provided to turn between "toast," "toast and hot dog," "hot dog," and "cancel." Both the bread heating element and steamer heating element can be activated by turning the knob selector 54b and depressing the slider or lever arm 34.

A method for utilizing the device 10, and/or for method for toasting bread and simultaneously cooking or warming another food with a single device, includes (without regard to order): inserting at least one piece of bread into a vertically oriented bread slot 26 of a combination bread toaster and steamer device 10; placing water into a heater pan 38 of a steamer compartment 18 on the combination bread toaster and steamer device; placing another food into the steamer compartment 18; and activating at least one heating element 42 and 46 associated with the bread slot 26 and the steamer compartment 18. In addition, a controller can be activated that initially activates a steamer heating element 46 associated with the steamer compartment 18, and that automatically and subsequently activates a bread heating element 42 associated with the bread slots 26. Activating the controller can include activating a single input 54.

As indicated above, the method can be utilized for making a breakfast sandwich, including: placing at least an egg white from an opened egg shell into an egg cup 66 in the steamer compartment 18; and activating a controller to activate the steamer heating element 46 for approximately four minutes, and to subsequently activate the bread heating element 42 at least approximately 45 seconds after activation of the steamer heating element.

In addition, a toast cooking control, such as a light to dark slide controller, can be engaged to select the desired degree of toasting for the bread. The bread heating element and the steamer heating element can be activated at the same time, but the bread heating element can deactivate prior to the steamer heating element. In such a case, the lift mechanism for the bread can be delayed to maintain the bread in the slot, and thus maintain the temperature of the bread, until the steamer heating element terminates.

The method can include placing a meat on a meat tray 90 disposable over the steamer compartment 18, the meat tray having a plurality of apertures 94 therein.

In addition, the handles 102a–c of the steamer cup 74, the meat tray 90 and a lid 86 can be aligned and engaged with adjacent handles to maintain alignment.

Furthermore, the method can include: deciding whether to cook an opened egg or an unopened egg, and then either: 1) placing at least an egg white of an opened egg in an egg cup 66 in the steamer cup 74; or placing an unopened egg into an aperture 78 of the steamer cup 74.

Referring to FIGS. 14–17, another combination bread toaster and steamer device, indicated generally at 10c, is shown in accordance with another exemplary embodiment of the present invention. The device 10c is similar to that described above, and the above description is relied upon with respect to the present device. The device 10c includes both a bread toaster or a bread toasting mechanism 14c and a steamer or a steamer compartment 18c integrated into a single appliance. The device 10c or toasting mechanism 14c includes four bread slots 26c, rather than two, and can be oriented front to back, rather than side to side. In addition, the slots can be grouped into pairs, so that two slots are associated together and operate together. Each pair can have a heating element separate from the other pair. In addition, each pair can have its own lift mechanism 30c and slide arm or lever 34c so that there are two lift mechanisms (and slide arms) to operate the four slots. The slide arms 34c can be disposed adjacent one another so that they can be engaged together, such as by a single finger. Each lift mechanism 30c and slide arm 34c can be associated with a separate bread heating element 42c.

The steamer 18c can be larger to accommodate more eggs due to the increased number of bread slots in the toaster. The steamer includes a heater pan 38c to receive water. A steamer or egg heating element 46c is disposed adjacent or below the heater pan 38c.

The device 10c can be configured to change operating wattage depending on use. For example, the bread heating elements 42c can each draw 800 watts, or 1600 watts total to toast the bread. But when the steamer 18c is used, the bread heating elements 42c can each draw only 700 watts, or 1400 watts total, while the steamer heating element can draw 400 watts (so that the device only draws 1800 watts total). Changing the wattage provides for safer operation, and also slows the toasting to be closer to the cooking time of the steamer or egg. Thus, the cooking of an egg in the steamer and the toasting of bread in the toaster (such as at the darkest setting) can be done simultaneously and can finish substantially at the same time due to reducing the wattage of the toaster when the steamer is operated. A controller can be configured to vary or switch the wattage between the heating elements. The controller can be automatic or based on user input.

The steamer compartment 18c can include one or more food cups or an egg cups 66c to receive a another food to be cooked or warmed, such as an egg, or the egg white and egg yoke of the opened egg. The steamer compartment 18c can include or can form an enclosure into which the egg cup 66c is placed so that steam, and the heat therefrom, surrounds the egg cup to cook the egg. The egg cups 66c can be provided in pairs, and can be circular or square.

The steamer compartment 18c can further include, and the enclosure can be formed by, a steamer cup 74c disposed over the heater pan 38c and around the egg cup 66c. The housing 22c can include a steamer cup indentation extending into the housing, both horizontally from a side and vertically from a top, to receive the steamer cup. A plurality of holes can be formed in the bottom of the steamer cup 74c to allow steam and heat to enter the steamer cup. The steamer cup 74c can be removably disposed on the steamer 18c or housing 22c so that it can be removed for cleaning, and can be used to remove the egg or egg cup 66c after cooking without having to grasp the hot egg or hot egg cup. A lid 86c can be removably disposed over the steamer cup 74c, and thus the egg cup 66c, to further form the enclosure. In addition, the steamer compartment is recessed into the housing below a top of the housing so that a top of the lid is disposed at an elevation substantially at an elevation of the top of the housing. In addition, a meat tray 90c can be disposable over the steamer compartment to warm a meat.

A storage tray or drawer 92 can be formed in, and slidable with respect to, the housing 22c to receive additional egg cups 66c or the meat tray 90c when not in use. The drawer 92 can be positioned under the steamer.

Referring to FIGS. 18–22, coordinated food preparation systems in accordance with various embodiments of the present invention are shown. The coordinated food preparation system includes two or more separate and discrete appliances for treating food. For example, as shown in FIGS. 18–22, the appliances can include a toaster, an egg steamer and a grill. Thus, the system can be configured as a breakfast sandwich making system, or to simultaneously toast bread or English muffins and cook one or more eggs. It is understood that the toaster, egg steamer and grill are only some examples of appliances, which can further include: a bread toaster, a steamer, a toaster oven, a rotisserie, a range, a water heater, a coffee maker, a tea pot, a cocoa maker, an espresso maker, a bread maker, a crock pot, a food warmer, a grill, an electric frying pan, a waffle maker, a skillet, a microwave, a juicer, a chopper, a food processor, a mixer, a grinder, a fryer, a blender, etc. Examples of coordination can include: a coffee grinder and coffee maker; a bread machine and a crock pot; a toaster oven and a coffee maker; a chopper and a fryer; a mixer and a waffle maker or skillet; etc.

Coordinating the functions or operation of multiple appliances can result in ease of performing the function or operations, while physically separating the appliances can result in greater flexibility and space utilization efficiency. By way of example, the coordination of a toaster and steamer can perform toasting and steaming functions when desired, while one of the appliances can be stored if not utilized as much. For example, the toaster can remain on the counter and used daily, while the steamer can be stored and brought out only when its use is desired, while still coordinating the operation of both when both are used. The function or operation of both the bread toaster and steamer can be coordinated to efficiently and automatically toast bread and cook or heat another food, such as an egg, as discussed in greater detail below. It will be appreciated that the cooking times for bread and another food, such as an egg, differ. Thus, the system can be configured to automatically delay toasting of the bread until after the steaming or egg cooking function has begun. Alternatively, the system can be configured to begin toasting of the bread and steaming or egg cooking at the same time, but can also maintain the bread or toast within the device until the steaming or egg cooking function terminates, in order to maintain the temperature of the bread or toast. The system can include electrical appliances, or appliances that utilize electricity to operate, such as heating elements, etc. Thus, the appliances can include electrical cords for plugging into electrical outlets. Alternatively, the appliances can be battery operated. Alternatively, the appliances might be hand or manually operated. Although food treating appliances have been described, other kitchen appliances might also be utilized, including can openers, vacuum bag sealers, electric knives or slicers, etc.

Thus, the system can include at least two separate and discrete food appliances, such as first and second food appliances 204 and 208, each including a separate and discrete housing, such as first and second housings. The appliances can be configured to have different operations, and/or to accommodate different foods. For example, the appliances can include a toaster to toast bread, and an egg steamer to steam an egg. Alternatively, the appliances can have similar or the same operation, and/or can accommodate similar or the same foods. For example, two toasters can be used to toast more bread, or two steamers can be used to steam two different vegetables. The food appliances are operatively intercoupled such that operation of one appliance depends on the other appliance, or such that operation of one appliance controls operation of the other appliance. For example, the toaster can control the steamer; or one toaster can control two or more toasters; or one steamer can control two or more steamers.

Figure 18:
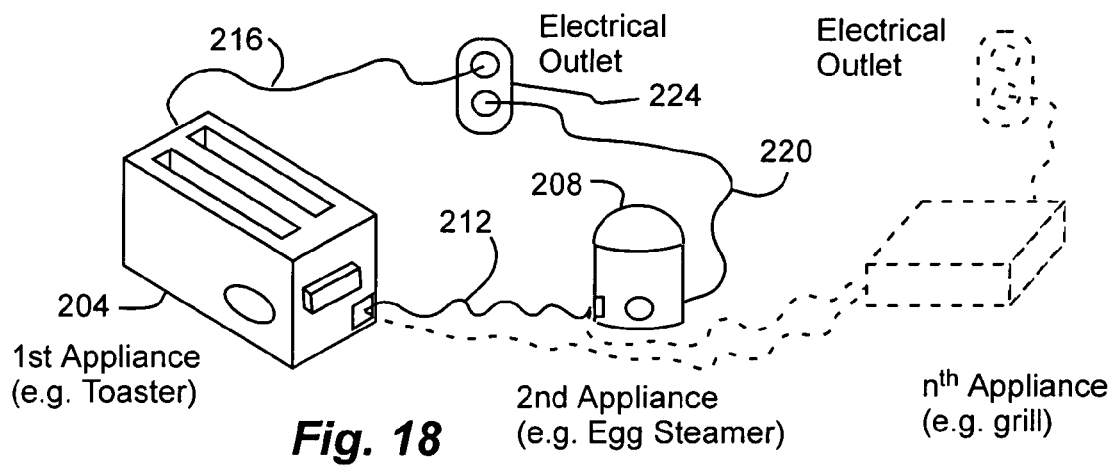
FIGS. 18–22 are schematic views of systems for operatively intercoupling and coordinating at least two separate and discrete appliances for treating food in accordance with embodiments of the present invention.

The appliances can be operatively intercoupled by a control wire 212 coupled therebetween and carrying a control signal therebetween, as shown in FIG. 18. Thus, the appliances can have separate electrical cords 216 and 220 that plug into standard electrical outlets 224. The control wire can operatively intercouple the controller of one appliance to the other. The coordinated operation can include a master-slave relationship, where one appliance controls the other. The electrical signal can be a command signal or a clock signal, etc. Alternatively, one appliance can simply receive operating conditions from one appliance and control its own operation. Alternatively, the control wire can be a mechanical wire that displaces inside a sheath to physically operate the appliance.

Figure 19:
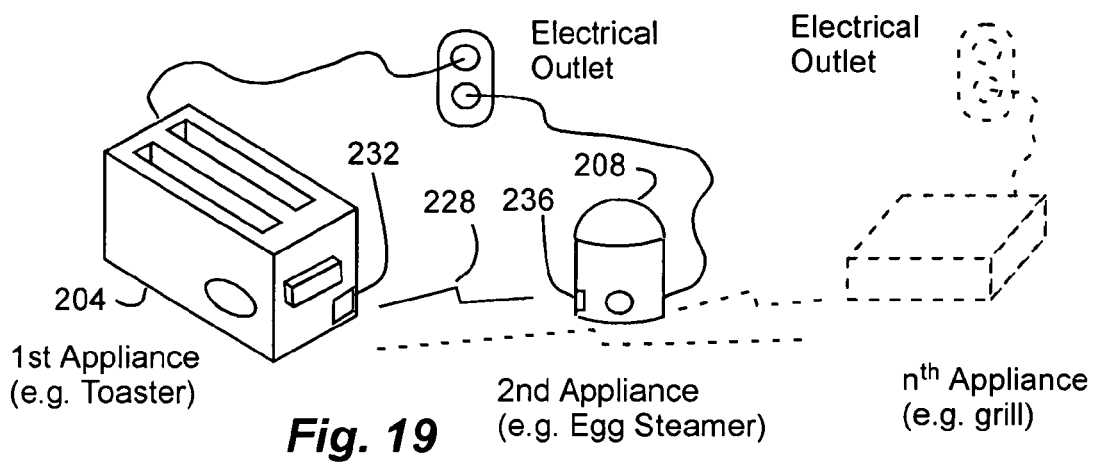

Similarly, the appliances can be operatively intercoupled by a wireless system, such as a radio frequency (RF) system, an infrared system (IR), etc., as shown in FIG. 19. The appliances can include a transmitter and a receiver to send and receive an electromagnetic control signal 228 therebetween. One appliance can include a transmitter 232 and the other can include a receiver 236; or both appliances can include transceivers. Again, the operation can be master-slave, clock driven, etc.

Figure 20:
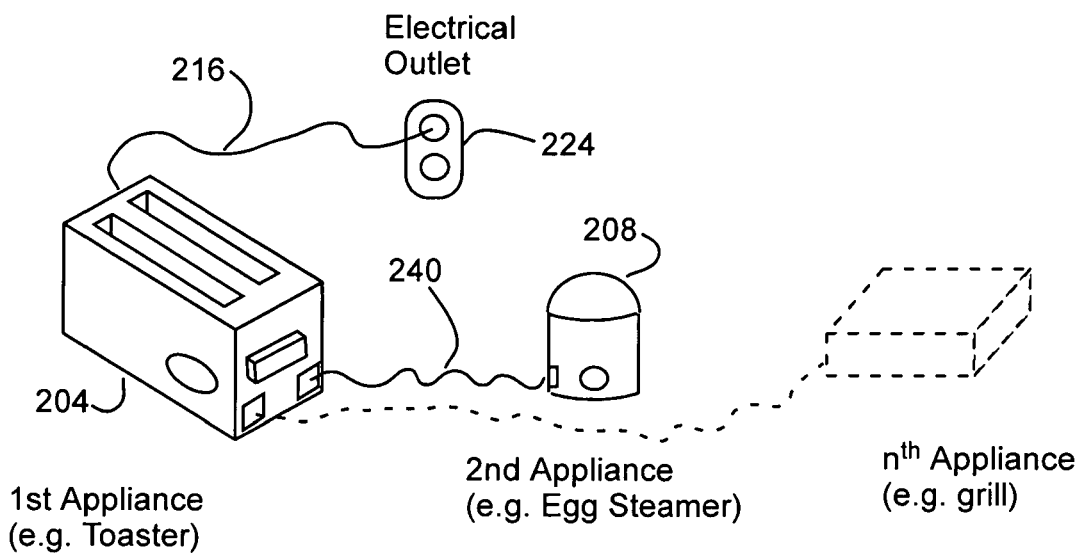

Alternatively, as shown in FIG. 20, a second appliance 208 can be electrically coupled (240) to the first appliance 204, and the second appliance received electrical power from the first appliance. The electrical connection can be a standard plug and socket, so that the second appliance can be plugged into a standard outlet and used independently. Alternatively, the plug and socket can be proprietary or different. Thus, the first appliance can be provided with multiple different outlets, each one corresponding to a different second or nth appliance. The appliances can be provided with specific plugs in order to coordinate control and/or voltage requirements.

The second and nth appliances can be coupled directly to the first appliance acting as a control appliance. Alternatively, the appliances can be daisy chained together.

Figure 21A:
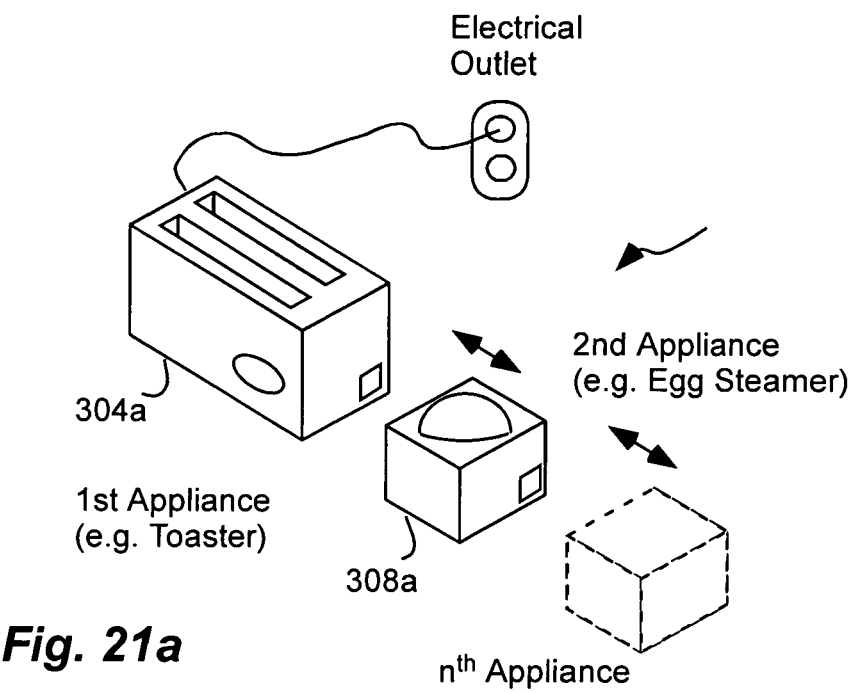
Figure 21B:
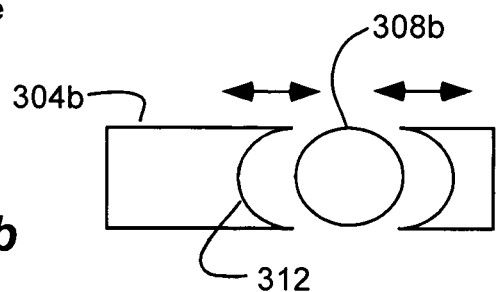

Alternatively, as shown in FIGS. 21a and b, the system 300 can be modular, and the appliances can have housings 304a and 308a that are modular, or that nest or mate. For example, one housing 304b can include a receptacle 312, and the other housing 308b can include a protrusion receivable within the receptacle. The receptacle and protrusion can provide a mating or matching interface that facilitates dual use of the appliances. In addition one housing can include an electrical receptacle, and the other housing can include an electrical plug receivable within the electrical receptacle.

Figure 22:
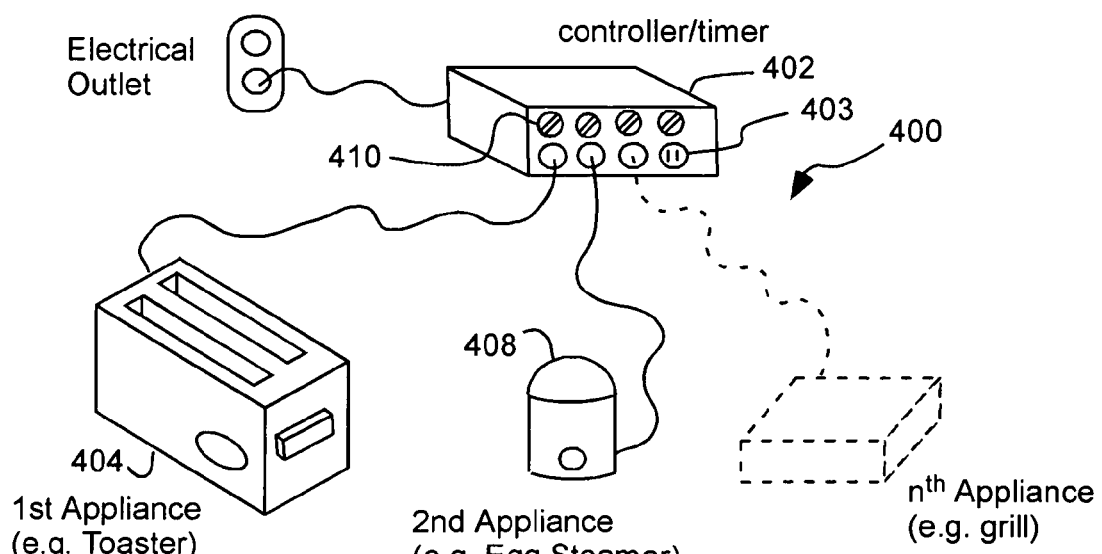

Alternatively, as shown in FIG. 22, the system 400 can include a separate and discrete control timer 402 including at least two electrical sockets 403 into which the appliances 404 and 408 are electrically coupled, and at least one timer 410 operatively coupled to the electrical sockets. Thus, the control timer can control one or more appliance, and can coordinate operation of multiple appliances.

The separate and discrete appliances can include a bread toaster and a steamer as described above, but separate from one another. For example, the system with a bread toaster and steamer can be utilized to make a breakfast sandwich. The separate and discrete toaster and steamer can be selectively and operatively intercoupled, as described above. For example, the steamer can be coupled to the toaster by a control wire, a signal or power supply.

A method for utilizing the systems described above includes determining which components to use and operatively intercoupling the components if desired. For example, one unit (such as a steamer) can be operatively coupled, such as by an electrical cord, to another unit (such as a toaster). In addition, the units may selectively physically couple or combine. One unit (such as the toaster) can be operated and can control operation of the other unit. Furthermore, the method can include providing one or more units and instructing to operatively intercouple the units.

Various aspects of the invention are shown in U.S. Provisional Patent Application Ser. Nos. 60/654,699, filed Feb. 17, 2005, and 60/717,954, filed Sep. 16, 2005; and U.S. patent application Ser. Nos. 11/155,007 and 11/154,282, both filed Jun. 15, 2005; all of which are herein incorporated by reference.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A method for toasting bread and simultaneously cooking or warming another food with a single device, comprising:
   inserting at least one piece of bread into a bread slot of a combination bread toaster and steamer device;
   placing water into a heater pan of a steamer compartment on the combination bread toaster and steamer device;
   placing another food into the steamer compartment;
   activating at least one bread heating element disposed adjacent the bread slot and a steamer heating element disposed adjacent the steamer compartment; and
   activation of the steamer heating element reducing wattage to the bread heating element that would be used by the bread heating element operating alone.

2. A method in accordance with claim 1, wherein activating the bread heating element and the steamer heating element further includes:
   activating only a single input on the combination bread toaster and steamer device that activates the steamer heating element and activates the bread heating element.

3. A method in accordance with claim 1, wherein activating the bread heating element and activating the steamer heating element further includes activating a controller shared by both the bread heating element and the steamer heating element.

4. A method in accordance with claim 1, wherein the steamer heating element draws approximately 400 watts; and wherein the at least one bread heating element draws approximately 1600 watts when operated alone and approximately 1400 watts when operated together with the steamer heating element.

5. A method in accordance with claim 1, wherein activating the at least one bread heating element further includes:
   activating bread heating elements disposed on both sides of the bread slot at a higher temperature or for a longer time period to toast;
   activating at least one bread heating element disposed adjacent the bread slot at a lower temperature or for a shorter time period to warm; or
   activating a bread heating element disposed only on one side of the bread slot to toast only one side.

6. A method for toasting bread and simultaneously cooking or warming another food with a single device, comprising:
   inserting at least one piece of bread into a bread slot of a combination bread toaster and steamer device;
   activating at least one bread heating element disposed adjacent the bread slot for a first time period and at a first wattage;
   placing water into a heater pan of a steamer compartment on the combination bread toaster and steamer device;
   placing another food into the steamer compartment;
   activating a steamer heating element disposed adjacent the heater pan, and the bread heating element for a second time period longer than the first time period and at a second wattage lower than the first wattage.

7. A method in accordance with claim 6, wherein activating the bread heating element and the steamer heating element further includes:
   activating only a single input on the combination bread toaster and steamer device that activates the steamer heating element and activates the bread heating element.

8. A method in accordance with claim 6, wherein activating the bread heating element and activating the steamer heating element further includes activating a controller shared by both the bread heating element and the steamer heating element.

9. A method in accordance with claim 6, wherein the steamer heating element draws approximately 400 watts; and wherein the at least one bread heating element draws approximately 1600 watts when operated alone and approximately 1400 watts when operated together with the steamer heating element.

10. A method in accordance with claim 6, wherein activating the at least one bread heating element further includes:
    activating bread heating elements disposed on both sides of the bread slot at a first temperature or for a third time period to toast;
    activating at least one bread heating element disposed adjacent the bread slot at a second temperature lower than the first temperature or for a fourth time period shorter than the third time period to warm; or
    activating a bread heating element disposed only on one side of the bread slot to toast only one side.

11. A combination bread toaster and steamer device, comprising:
    a) a housing;
    b) at least one bread slot extending into the housing;
    c) at least one bread heating element disposed adjacent the bread slot;
    d) a steamer compartment, disposed on the housing, including a heater pan configured to receive water;
    e) a steamer heating element disposed adjacent the heater pan; and
    f) a controller operatively coupled to the bread heating element and the steamer heating element; and
    g) the at least one bread heating element including a variable wattage heating element and the controller being configured to reduce wattage to the variable wattage heating element when the steamer heating element is operated.

12. A device in accordance with claim 11, wherein the steamer heating element draws approximately 400 watts; and wherein the at least one bread heating element draws approximately 1600 watts when operated alone and approximately 1400 watts when operated together with the steamer heating element.

13. A device in accordance with claim 11, further comprising: a selection control operatively coupled to the bread heating element and the steamer heating element, and selectable between at least three operating conditions, including:
    operation of only the bread heating element;
    operation of only the steamer heating element; and
    operation of both the bread heating element and the steamer heating element.

* * * * *